(12) United States Patent
Nishizawa

(10) Patent No.: US 11,932,435 B2
(45) Date of Patent: Mar. 19, 2024

(54) FILLING NOZZLE

(71) Applicant: Chugai Seiyaku Kabushiki Kaisha, Tokyo (JP)

(72) Inventor: Shaw Nishizawa, Tokyo (JP)

(73) Assignee: Chugai Seiyaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/206,253

(22) Filed: Jun. 6, 2023

(65) Prior Publication Data

US 2023/0382581 A1    Nov. 30, 2023

Related U.S. Application Data

(62) Division of application No. 17/059,342, filed as application No. PCT/JP2019/021115 on May 28, 2019, now Pat. No. 11,708,186.

(30) Foreign Application Priority Data

May 28, 2018  (JP) ................. 2018-101787

(51) Int. Cl.
| | |
|---|---|
| B65B 39/00 | (2006.01) |
| B05B 15/525 | (2018.01) |
| B05B 15/65 | (2018.01) |
| B65B 3/00 | (2006.01) |
| B65B 3/04 | (2006.01) |

(52) U.S. Cl.
CPC ............ B65B 39/00 (2013.01); B05B 15/525 (2018.02); B05B 15/65 (2018.02); B65B 3/003 (2013.01); B65B 3/04 (2013.01)

(58) Field of Classification Search
CPC .......... B65B 39/00; B65B 3/003; B65B 3/04; B05B 15/65; B05B 15/525

USPC .......................... 222/566, 571; 422/501, 922
See application file for complete search history.

(56) References Cited

U.S. PATENT DOCUMENTS

| | | | |
|---|---|---|---|
| 4,809,885 | A | 3/1989 | Hayashi et al. |
| 6,915,927 | B2 | 7/2005 | Stukas |
| 2003/0155384 | A1 | 8/2003 | Nagahata et al. |
| 2009/0095057 | A1 | 4/2009 | Staats |
| 2016/0325045 | A1 | 11/2016 | Ito et al. |
| 2017/0197024 | A1 | 7/2017 | Kiminami et al. |

(Continued)

FOREIGN PATENT DOCUMENTS

| | | |
|---|---|---|
| EP | 0278560 A1 | 8/1988 |
| EP | 1232753 A1 | 8/2002 |

(Continued)

OTHER PUBLICATIONS

International Search Report dated Jul. 16, 2019 in International Patent Application No. PCT/JP2019/021115, 2 pages.

(Continued)

*Primary Examiner* — Timothy L Maust
(74) *Attorney, Agent, or Firm* — Nixon & Vanderhye P.C.

(57) ABSTRACT

The present invention provides a filling nozzle obtained by using a resin selected from a cycloolefin polymer and a cycloolefin copolymer, or a filling nozzle including a tubular passage for supplying a pharmaceutical solution, and a filling port disposed at a lower end of the tubular passage, in which the tubular passage and the filling port have a circular peripheral cross-section, and an inner diameter of the passage of the filling port is larger than an inner diameter of the tubular passage disposed on an upstream side.

10 Claims, 19 Drawing Sheets

(56) References Cited

U.S. PATENT DOCUMENTS

| | | |
|---|---|---|
| 2017/0297042 A1 | 10/2017 | Songbe |
| 2018/0133375 A1 | 5/2018 | Shiozaki et al. |
| 2018/0348098 A1 | 12/2018 | Araki et al. |
| 2021/0229848 A1 | 7/2021 | Nishizawa |

FOREIGN PATENT DOCUMENTS

| | | |
|---|---|---|
| EP | 3055003 | 4/2015 |
| JP | 2001090676 A | 4/2001 |
| JP | 2003237734 A | 8/2003 |
| JP | 2004217215 A | 8/2004 |
| JP | 2006220645 A | 8/2006 |
| JP | 2006223944 A | 8/2006 |
| JP | 2010189029 A | 9/2010 |
| JP | 2013086826 A | 5/2013 |
| JP | 2015134639 A | 7/2015 |
| JP | 2015140186 A | 8/2015 |
| JP | 2017190188 A | 10/2017 |
| KR | 1020150114754 A | 10/2015 |
| KR | 20160120715 A | 10/2016 |
| WO | WO2015054075 A1 | 4/2015 |
| WO | WO2017073533 A1 | 5/2017 |
| WO | WO2017137470 A1 | 8/2017 |
| WO | WO2017188061 A1 | 11/2017 |
| WO | WO2019230725 A1 | 12/2019 |

OTHER PUBLICATIONS

Hanslip, S., et al., "Syringe Filling of High-Concentration mAb Formulation: Slow Suck-Back Pump Speed Prevented Filling Needle Clogging," J Pharm Sci., 106:3651-3653 (2017).

Hanslip, S., et al., "Syringe Filling of High-Concentration mAb Formulation: Experimental, Theoretical, and Computational Evaluation of Filling Process Parameters That Influence the Propensity for Filling Needle Clogging," J Pharm Sci., 108:1130-1138 (2019).

Shieu, W., et al., "Filling of High-Concentration Monoclonal Antibody Formulations into Pre-Filled Syringes: Filling Parameter Investigation and Optimization," PDA J Pharm Sci Technol., 68(2):153-163 (2014).

Shieu, W., et al., "Filling of High-Concentration Monoclonal Antibody Formulations into Pre-filled Syringes: Investigating Formulation-Nozzle Interactions To Minimize Nozzle Clogging," PDA J Pharm Sci Technol., 69(3):417-426 (2015).

Shieu, W., et al., "Filling of High-Concentration Monoclonal Antibody Formulations: Investigating Underlying Mechanisms That Affect Precision of Low-Volume Fill by Peristaltic Pump," PDA J Pharm Sci Technol., 70(2):143-156 (2016).

Extended European Search Report dated Feb. 3, 2022 in European Patent Application No. 19811082.7.

Przykaza, K., et al., "Wetting Properties of Polyetheretherketone Plasma Activated and Biocoated Surfaces," Colloids Interfaces, 3:40 (2019), 14 pages.

Witek, M. A., et al., "Methods for Activating and Functionalizing Thermoplastic Surfaces," CBMM Webinar Series Nov. 23, 2020.

(a)          (b)          (c)

(a)      (b)      (c)

(a) (b) (c)

(a) (b) (c) (d) (e) (f)

(a)　　　(b)　　　(c)

FILLING NOZZLE

CROSS-REFERENCE TO RELATED APPLICATIONS

This application is a divisional of U.S. patent application Ser. No. 17/059,342, 371(c) date Nov. 27, 2020, which is a U.S. National Phase of PCT Application No. PCT/JP2019/021115, filed May 28, 2019, which claims the benefit of Japanese Patent Application No. 2018-101787, filed May 28, 2018, each of which is incorporated herein by reference in its entirety.

TECHNICAL FIELD

The present invention relates to a filling nozzle to be used for filling a liquid in a vessel. The present invention also relates to a production method for a product including a liquid filling step. In particular, the present invention relates to a filling nozzle to be used for filling a pharmaceutical solution in a vessel, and a production method for a liquid pharmaceutical formulation including a step of filling a pharmaceutical solution in a vessel.

BACKGROUND ART

In production of food, daily necessities, pharmaceuticals and the like, a solution held in a filling tank is filled with a pump in a vessel through a filling tube or a filling nozzle in a step of filling a liquid in a vessel. As a material for forming a filling nozzle to be used in production of a pharmaceutical, stainless steel or a resin such as polyether ether ketone (PEEK) is generally used.

When a prescribed amount of liquid is continuously filled in a vessel in the filling step, there arises a problem of dripping from the tip of the filling nozzle. The dripping from the tip of the filling nozzle contaminates a product to be produced, contaminates the production environment, and lowers filling accuracy, which may cause product quality deterioration or productivity deterioration. Various examinations have been made on development of a filling nozzle in which dripping is prevented (Patent Literatures 1 to 3).

In production of a liquid pharmaceutical formulation, a pharmaceutical solution is filled in a vessel such as a vial, a syringe, a cartridge, an ampoule, a device, a bag, a bottle, an elastomeric reservoir, or a tube. The filling step is performed under an environment in which an aseptic state is highly maintained. In particular, a liquid pharmaceutical formulation of a protein solution cannot be subjected to a sterilization step by heating or radiation exposure after the filling. Therefore, in production of a liquid pharmaceutical formulation containing a protein as an active ingredient, a protein solution is filled in a vessel immediately after sterilization filtration through a membrane filter.

In an aseptic environment employed for pharmaceutical production, air having passed through a high efficiency particulate air filter (HEPA filter) is circulated, and hence, there arises a problem in which a pharmaceutical solution adhering to the tip of a filling nozzle is dried. When a pharmaceutical component thus dried adheres to the tip of the filling nozzle, lowering of filling accuracy, contamination of a product to be produced, contamination of the production environment, and clogging of the filling nozzle occur, which may cause deterioration of the product quality and deterioration of the productivity. In particular, when the filling nozzle is clogged by adhesion of the dried pharmaceutical component, the production cannot be continued because the pharmaceutical solution cannot be discharged through the filling nozzle. In this case, the production of the pharmaceutical or the aseptic environment is intermitted once for restoration, and therefore, it is necessary to discard a production lot, to discard a prepared pharmaceutical solution, or to decontaminate the aseptic environment, which causes a large loss economically and in time.

In production of a liquid pharmaceutical formulation, in order to prevent clogging of a filling nozzle, a method in which a solution remaining in the filling nozzle is withdrawn by reversing a pump after filling the pharmaceutical solution (suck-back) is generally employed. Even when the suck-back is employed, however, the liquid adhering to the inner wall of the filling nozzle may move to and stagnate at the tip of the filling nozzle, and hence a dried pharmaceutical component is accumulated to cause the clogging in some cases. Study results on a method for preventing such clogging have been reported (Non Patent Literatures 1 to 5).

CITATION LIST

Patent Literature

Patent Literature 1: Japanese Patent Laid-Open No. 2003-237734
Patent Literature 2: Japanese Patent Laid-Open No. 2004-217215
Patent Literature 3: Japanese Patent Laid-Open No. 2010-189029

Non Patent Literature

Non Patent Literature 1: PDA J Pharm Sci Technol. (2014) Mar-Apr; 68(2): 153-63
Non Patent Literature 2: PDA J Pharm Sci Technol. (2015) May-Jun; 69(3): 417-26
Non Patent Literature 3: PDA J Pharm Sci Technol. (2016) Mar-Apr; 70(2): 143-156
Non Patent Literature 4: J Pharm Sci. (2017) Dec; 106(12): 3651-3653
Non Patent Literature 5: J Pharm Sci. (2019) Mar; 108(3): 1130-1138

SUMMARY OF INVENTION

Technical Problem

From the viewpoint of improving filling accuracy and filling efficiency, a method for improving draining of a liquid occurring after discharge and for preventing dripping has been examined, and for example, Patent Literature 2 discloses a filling nozzle in a specific shape (FIGS. 3 to 6). Owing to this shape, a droplet is expanded in a horizontal direction and held by surface tension in a discharge portion at the tip of the nozzle, and hence the discharge portion works as a liquid reservoir, and thus, dripping of a liquid substance is prevented (Patent Literature 2, [0021]). In a pharmaceutical solution to be prepared for producing a liquid pharmaceutical formulation, particularly a protein solution having a high concentration, however, adhesion of a solid component due to drying easily occurs. In the filling nozzle in the above-described shape including a liquid reservoir, a solid component dried in the liquid reservoir frequently causes clogging, and hence such a filling nozzle cannot be used for production of a liquid pharmaceutical formulation.

Besides, a protein such as an antibody used as a raw material of a pharmaceutical formulation is expensive in production cost, and if a protein solution having a high concentration is discarded because of intermission of the production, the economic loss is extremely large. As described above, a method for preventing clogging of a filling nozzle in the production of a liquid pharmaceutical formulation has been examined (Non Patent Literatures 1 to 5). Even when the suck-back is performed, however, a pharmaceutical solution remaining in a passage moves in a downstream direction, and adheres, in the form of a droplet, in the vicinity of the tip of the nozzle. The liquid thus adhering in the vicinity of the tip of the nozzle in the form of a droplet is dried and solidified, resulting in clogging the filling nozzle. Besides, from the viewpoint of assuring stable production of a liquid pharmaceutical formulation, particularly a liquid pharmaceutical formulation containing, as an active ingredient, a high concentration of a protein such as an antibody, this method cannot be adequate solution, and there is a demand for other means for preventing clogging of a filling nozzle.

Furthermore, when a foreign matter or a fine particle generated by the clogging of a filling nozzle is mixed in a pharmaceutical formulation, it can be a cause of deterioration of product quality, or discard of products or a production lot. Also from the viewpoint of preventing contamination of a clean environment, a method for preventing clogging of a filling nozzle by simple means not impairing productivity is demanded.

Solution to Problem

In consideration of the above-described problems, the present inventors have made earnest studies, and as a result, have found that a filling nozzle having a specific shape, and/or produced from a specific material can inhibit a pharmaceutical solution from stagnating at the tip of the filling nozzle, and thus, the present invention was accomplished.

In one aspect of the present invention, the following inventions (1-1) to (1-15) are provided:
- (1-1) A filling nozzle, comprising a nozzle body having a tubular passage for supplying a pharmaceutical solution, and a filling port formed at a lower end of the tubular passage, for discharging the pharmaceutical solution from the filling port,
  in which the filling nozzle is formed by using, as a material, a resin selected from a cycloolefin polymer and a cycloolefin copolymer.
- (1-2) The filling nozzle according to (1-1), in which the resin is selected from a cycloolefin copolymer that is a copolymer of a cyclic olefin and an olefin, a cycloolefin ring-opening polymer, and a hydrogenated product of the cycloolefin ring-opening polymer.
- (1-3) The filling nozzle according to (1-1) or (1-2), in which the resin is an ethylene-norbornene copolymer.
- (1-4) The filling nozzle according to (1-3), in which the ethylene-norbornene copolymer contains a repeating structure derived from addition polymerization of norbornene.
- (1-5) The filling nozzle according to any one of (1-1) to (1-4), in which an inner diameter of the tubular passage is 0.6 to 5.0 mm
- (1-6) The filling nozzle according to any one of (1-1) to (1-5), in which an inner diameter of the tubular passage is 0.8 to 4.0 mm
- (1-7) The filling nozzle according to any one of (1-1) to (1-6), in which an inner diameter of the tubular passage is 1.0 to 3.0 mm
- (1-8) The filling nozzle according to any one of (1-1) to (1-7), in which the tubular passage has a constant inner diameter as a whole.
- (1-9) The filling nozzle according to any one of (1-1) to (1-8), in which a length in the length direction of the filling nozzle is 10.0 to 300.0 mm
- (1-10) The filling nozzle according to any one of (1-1) to (1-9), in which a difference between an outer diameter and an inner diameter of the tubular passage of the filling nozzle is 5 mm or less.
- (1-11) The filling nozzle according to any one of (1-1) to (1-10), in which a difference between an outer diameter and an inner diameter of the tubular passage of the filling nozzle is 0.1 to 3.0 mm
- (1-12) The filling nozzle according to any one of (1-1) to (1-11), in which a difference between an outer diameter and an inner diameter of the tubular passage of the filling nozzle is 0.2 to 2.0 mm
- (1-13) The filling nozzle according to any one of (1-1) to (1-12), in which an angle of a surface of a lower end of the filling port against a vertical direction to a nozzle length direction is 0 to 75 degrees.
- (1-14) The filling nozzle according to any one of (1-1) to (1-13), in which an angle of a surface of a lower end of the filling port against a vertical direction to a nozzle length direction is 0 to 60 degrees.
- (1-15) The filling nozzle according to any one of (1-1) to (1-14), in which an angle of a surface of a lower end of the filling port against a vertical direction to a nozzle length direction is 0 to 45 degrees.

In another aspect of the present invention, the following inventions (2-1) to (2-45) are provided:
- (2-1) A filling nozzle including a nozzle body having a tubular passage for supplying a pharmaceutical solution, and a filling port having a passage formed continuously to a lower end of the tubular passage for discharging the pharmaceutical solution from a tip of the filling port, in which the tubular passage of the nozzle body and the passage of the filling port have a circular peripheral cross-section, an inner diameter of the passage of the filling port is larger than an inner diameter of the tubular passage disposed on an upstream side, and the filling nozzle is formed by using a material having a water contact angle of 50 degrees or more.
- (2-2) The filling nozzle according to (2-1), in which the tubular passage is connected to the passage of the filling port via an inclined portion having an inner diameter increasing toward a downstream direction.
- (2-3) The filling nozzle according to (2-2), in which an angle between an inner surface of the inclined portion and an inner surface of the passage of the filling port in a cross-sectional shape in a length direction crossing a diameter is 45 to 170 degrees.
- (2-4) The filling nozzle according to (2-3), in which the angle between the inner surface of the inclined portion and the inner surface of the passage of the filling port is 90 to 150 degrees.
- (2-5) The filling nozzle according to (2-3) or (2-4), in which the angle between the inner surface of the inclined portion and the inner surface of the passage of the filling port is 90 to 135 degrees.

(2-6) The filling nozzle according to any one of (2-1) to (2-5), in which the water contact angle is 58 degrees or more.
(2-7) The filling nozzle according to any one of (2-1) to (2-6), in which the water contact angle is 58 to 120 degrees.
(2-8) The filling nozzle according to any one of (2-1) to (2-7), in which the water contact angle is 80 to 100 degrees.
(2-9) The filling nozzle according to any one of (2-1) to (2-8), in which the water contact angle is 80 to 94 degrees.
(2-10) The filling nozzle according to any one of (2-1) to (2-9), formed by using a transparent material.
(2-11) The filling nozzle according to any one of (2-1) to (2-10), in which the material is a resin selected from a cycloolefin polymer and a cycloolefin copolymer.
(2-12) The filling nozzle according to (2-11), in which the resin is selected from a cycloolefin copolymer that is a copolymer of a cyclic olefin and an olefin, a cycloolefin ring-opening polymer, and a hydrogenated product of the cycloolefin ring-opening polymer.
(2-13) The filling nozzle according to (2-11) or (2-12), in which the resin is an ethylene-norbornene copolymer.
(2-14) The filling nozzle according to (2-13), in which the ethylene-norbornene copolymer contains a repeating structure derived from addition polymerization of norbornene.
(2-15) The filling nozzle according to any one of (2-1) to (2-14), in which an inner diameter of the passage of the filling port is 1.0 to 6.0 mm
(2-16) The filling nozzle according to any one of (2-1) to (2-15), in which an inner diameter of the passage of the filling port is 1.2 to 4.0 mm
(2-17) The filling nozzle according to any one of (2-1) to (2-16), in which a length in the length direction of the passage of the filling port is 1.0 to 10.0 mm
(2-18) The filling nozzle according to any one of (2-1) to (2-17), in which a length in the length direction of the passage of the filling port is 2.1 to 7.0 mm
(2-19) The filling nozzle according to any one of (2-1) to (2-18), in which a length in the length direction of the passage of the filling port is 2.1 to 6.0 mm
(2-20) The filling nozzle according to any one of (2-1) to (2-19), in which a length in the length direction of the passage of the filling port is 2.1 to 5.0 mm
(2-21) The filling nozzle according to any one of (2-1) to (2-20), in which a length in the length direction of the passage of the filling port is 3.0 to 5.0 mm
(2-22) The filling nozzle according to any one of (2-1) to (2-21), in which the passage of the filling port has a constant inner diameter as a whole.
(2-23) The filling nozzle according to any one of (2-1) to (2-22), in which an inner diameter of the tubular passage is 0.8 to 4.0 mm
(2-24) The filling nozzle according to any one of (2-1) to (2-23), in which an inner diameter of the tubular passage is 1.0 to 3.0 mm
(2-25) The filling nozzle according to any one of (2-1) to (2-24), in which the tubular passage has a constant inner diameter as a whole.
(2-26) The filling nozzle according to any one of (2-1) to (2-25), in which a length in the length direction of the filling nozzle is 10.0 to 300.0 mm
(2-27) The filling nozzle according to any one of (2-1) to (2-26), in which a ratio d/c of a length (d) in the length direction of the passage of the filling port to an inner diameter (c) of the passage of the filling port is 0.4 to 3.9.
(2-28) The filling nozzle according to any one of (2-1) to (2-27), in which a ratio d/c of a length (d) in the length direction of the passage of the filling port to an inner diameter (c) of the passage of the filling port is 0.7 to 2.7.
(2-29) The filling nozzle according to any one of (2-1) to (2-28), in which a ratio d/c of a length (d) in the length direction of the passage of the filling port to an inner diameter (c) of the passage of the filling port is 1.1 to 2.0.
(2-30) The filling nozzle according to any one of (2-1) to (2-29), in which a difference between an inner diameter of the passage of the filling port and an inner diameter of the tubular passage is 0.2 to 5.0 mm
(2-31) The filling nozzle according to any one of (2-1) to (2-30), in which a difference between an outer diameter of the filling nozzle and an inner diameter of the passage of the filling port is 5 mm or less.
(2-32) The filling nozzle according to any one of (2-1) to (2-31), in which a difference between an outer diameter of the filling nozzle and an inner diameter of the passage of the filling port is 0.1 to 3.0 mm
(2-33) The filling nozzle according to any one of (2-1) to (2-32), in which a difference between an outer diameter of the filling nozzle and an inner diameter of the passage of the filling port is 0.2 to 2.0 mm
(2-34) The filling nozzle according to any one of (2-1) to (2-33), in which an angle of a surface of a lower end of the filling port against a vertical direction to a nozzle length direction is 0 to 75 degrees.
(2-35) The filling nozzle according to any one of (2-1) to (2-34), in which an angle of a surface of a lower end of the filling port against a vertical direction to a nozzle length direction is 0 to 60 degrees.
(2-36) The filling nozzle according to any one of (2-1) to (2-35), in which an angle of a surface of a lower end of the filling port against a vertical direction to a nozzle length direction is 0 to 45 degrees.
(2-37) The filling nozzle according to any one of (2-1) to (2-36), wherein the inner diameter of the passage of the filling port in a connecting portion to the tubular passage or an inclined portion is larger than an inner diameter of the connecting portion to the tubular passage or the inclined portion.
(2-38) The filling nozzle according to any one of (2-1) to (2-24) and (2-26) to (2-37), in which the tubular passage has a shape having an inner diameter increasing toward an upstream direction.
(2-39) The filling nozzle according to any one of (2-1) to (2-38), in which a length in the length direction of the filling nozzle is 100.0 to 140.0 mm
(2-40) The filling nozzle according to (2-1) to (2-39), in which a length in the length direction of the passage of the filling port is 3.0 to 4.0 mm
(2-41) The filling nozzle according to any one of (2-1) and (2-4) to (2-39), in which the tubular passage is connected to the passage of the filling port not via an inclined portion.
(2-42) The filling nozzle according to any one of (2-1) to (2-40), in which the tubular passage is connected to the passage of the filling port via an inclined portion having an inner diameter increasing toward a downstream direction, and an angle between an inner surface of the inclined portion and an inner surface of the passage of the filling port in a cross-sectional shape in a length direction crossing a diameter is 107.5 to 117.5 degrees.

(2-43) The filling nozzle according to any one of (2-1) to (2-42), in which an inner diameter of the passage of the filling port in a connecting portion to the tubular passage or an inclined portion is 2.0 to 3.0 mm (2-44) The filling nozzle according to any one of (2-1) to (2-43), in which an inner diameter of the tubular passage in a connecting portion to the passage or an inclined portion is 1.1 to 2.1 mm (2-45) The filling nozzle according to any one of (2-1) to (2-12) and (2-15) to (2-44), in which the material is a resin selected from cycloolefin polymers.

In another aspect of the present invention, the following inventions (3-1) to (3-14) are provided:

(3-1) A production method for a liquid pharmaceutical formulation, including a step of filling a pharmaceutical solution in a vessel by using the filling nozzle according to any one of (1-1) to (1-15) and (2-1) to (2-45).

(3-2) The production method according to (3-1), in which an amount of the pharmaceutical solution contained in the liquid pharmaceutical formulation is 0.1 to 50.0 mL.

(3-3) The production method according to (3-1) or (3-2), in which a viscosity of the pharmaceutical solution to be filled is 1 to 1000 cP.

(3-4) The production method according to any one of (3-1) to (3-3), in which a concentration of an active ingredient in the pharmaceutical solution to be filled is 30 to 350 mg/mL.

(3-5) The production method according to any one of (3-1) to (3-4), in which surface tension of the pharmaceutical solution to be filled is 30 to 72 mN/m.

(3-6) The production method according to any one of (3-1) to (3-5), in which the pharmaceutical solution to be filled contains a protein as an active ingredient.

(3-7) The production method according to any one of (3-1) to (3-6), in which the pharmaceutical solution to be filled contains an antibody as an active ingredient.

(3-8) The production method according to any one of (3-1) to (3-7), in which the pharmaceutical solution contains a surfactant as an additive.

(3-9) The production method according to any one of (3-1) to (3-8), in which the vessel is a vial, a syringe, a cartridge, an ampoule, a device, a bag, a bottle, an elastomeric reservoir, or a tube.

(3-10) The production method according to any one of (3-1) to (3-9), in which a filling rate of the pharmaceutical solution is 0.1 to 1000 mL/min (3-11) The production method according to any one of (3-1) to (3-10), further including a step of withdrawing the pharmaceutical solution remaining in the filling nozzle by reversing a pump after filling the pharmaceutical solution.

(3-12) The production method according to any one of (3-1) to (3-10), not including a step of withdrawing the pharmaceutical solution remaining in the filling nozzle by reversing a pump after filling the pharmaceutical solution.

(3-13) The production method according to any one of (3-1) to (3-12), performed under a clean room environment or in clean room facilities.

(3-14) The production method according to any one of (3-1) to (3-12), performed in an aseptic pharmaceutical production area.

In another aspect of the present invention, the following inventions (4-1) to (4-5) are provided:

(4-1) A liquid pharmaceutical filling device, including the filling nozzle according to any one of (1-1) to (1-15) and (2-1) to (2-45).

(4-2) The filling device according to (4-1), further including a filling tube, in which the filling tube is linked to the filling nozzle in such a manner that the pharmaceutical solution can be supplied to the filling nozzle.

(4-3) The filling device according to (4-2), further including a filling pump, in which the filling pump is linked on an upstream side from the filling tube.

(4-4) The filling device according to (4-3), in which the filling pump is selected from a syringe pump, a pinch valve pump, a weight filling pump, a mass flow pump, a diaphragm pump, a smooth flow pump, and a peristaltic pump.

(4-5) The filling device according to (4-4), further including a filling tank, in which the filling tank is linked in such a manner that the pharmaceutical solution held in the filling tank can be supplied by the filling pump to the filling nozzle through the filling tube.

In still another aspect of the present invention, the following inventions (5-1) to (5-12) are provided:

(5-1) A filling nozzle, comprising a nozzle body having a tubular passage for supplying a pharmaceutical solution, and a filling port having a passage formed continuously to a lower end of the tubular passage, for discharging the pharmaceutical solution from a tip of the filling port,
in which the tubular passage of the nozzle body and the passage of the filling port have a circular peripheral cross-section, and an inner diameter of the passage of the filling port is larger than an inner diameter of the tubular passage disposed on an upstream side, and
the filling nozzle is formed by using a material having a water contact angle of 50 to 120 degrees.

(5-2) The filling nozzle according to (5-1), in which the tubular passage is connected to the passage of the filling port via an inclined portion having an inner diameter increasing in a downstream direction.

(5-3) The filling nozzle according to (5-1) or (5-2), in which the inner diameter of the passage of the filling port in a connecting portion to the tubular passage or an inclined portion is larger than an inner diameter of the connecting portion to the tubular passage or the inclined portion.

(5-4) The filling nozzle according to any one of (5-1) to (5-3), in which the material is a resin having a water contact angle of 80 to 94 degrees.

(5-5) The filling nozzle according to any one of (5-1) to (5-4), in which the material is a resin selected from a cycloolefin polymer and a cycloolefin copolymer.

(5-6) A filling nozzle, comprising a nozzle body having a tubular passage for supplying a pharmaceutical solution, and a filling port formed at a lower end of the tubular passage, for discharging the pharmaceutical solution from the filling port,
in which the filling nozzle is formed by using, as a material, a resin selected from a cycloolefin polymer and a cycloolefin copolymer.

(5-7) The filling nozzle according to any one of (5-1) to (5-6), in which the material is selected from a cycloolefin copolymer that is a copolymer of a cyclic olefin and an olefin, a cycloolefin ring-opening polymer, and a hydrogenated product of the cycloolefin ring-opening polymer.

(5-8) The filling nozzle according to any one of (5-1) to (5-7), in which the material is an ethylene-norbornene copolymer.

(5-9) The filling nozzle according to (5-8), in which the ethylene-norbornene copolymer contains a repeating structure derived from addition polymerization of norbornene.

(5-10) The filling nozzle according to any one of (5-1) to (5-9), in which the material is selected from a norbornene ring-opening polymer that may be substituted with C1-6 alkyl, and a hydrogenated product of the ring-opening polymer.

(5-11) A production method for a liquid pharmaceutical formulation, comprising a step of filling a pharmaceutical solution in a vessel by using the filling nozzle according to any one of (5-1) to (5-10).

(5-12) The production method according to (5-11), in which an active ingredient contained in the pharmaceutical solution is an antibody.

Advantageous Effects of Invention

When a filling nozzle provided by the present invention is used, a solid component formed when a pharmaceutical solution is dried is inhibited from adhering to a tip portion of the filling nozzle, and hence a liquid pharmaceutical formulation can be stably produced. Besides, according to a production method for a liquid pharmaceutical formulation provided by the present invention, a liquid pharmaceutical formulation can be efficiently and economically produced.

DESCRIPTION OF EMBODIMENTS

Now, one embodiment of a filling nozzle of the present invention will be exemplarily described.

Figure 1:
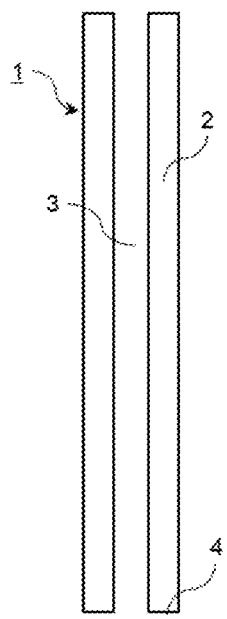
FIG. 1 is a schematic cross-sectional view of an example of a filling nozzle according to an embodiment of the present invention.

FIG. 1 is a cross-sectional view of a filling nozzle of the present invention having a circular circumferential cross-section taken on a length direction passing through a diameter of the circumferential cross-section. The filling nozzle 1 of FIG. 1 is formed by using a resin selected from a cycloolefin polymer and a cycloolefin copolymer, and a tubular passage 3 continuous to a filling port 4 is provided in a nozzle body 2. A solution flowing through the tubular passage 3 of the nozzle body 2 is supplied into a vessel through the filling port 4.

Figure 2A:
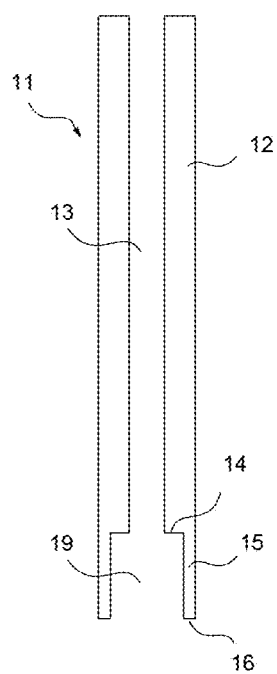
FIG. 2a is a schematic cross-sectional view of an example of a filling nozzle according to an embodiment of the present invention.

In a filling nozzle 11 of FIG. 2a, a filling port 15 is provided continuously to a lower end 14 of a nozzle body 12. The filling port 15 has a passage 19 having an inner diameter larger than an inner diameter of a tubular passage 13 provided in the nozzle body 12. A solution flowing through the tubular passage 13 of the nozzle body 12 is supplied into a vessel through the passage 19 of the filling port 15.

Figure 2B:
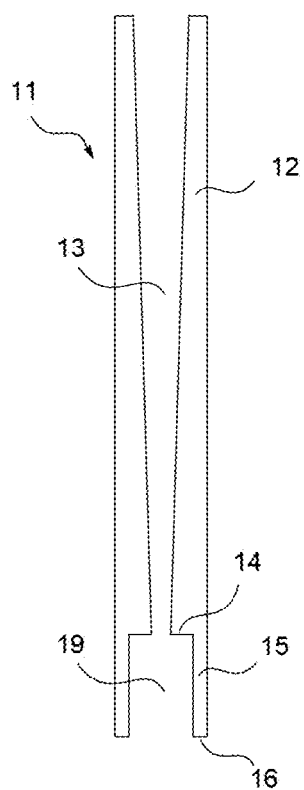
FIG. 2b is a schematic cross-sectional view of an example of a filling nozzle according to an embodiment of the present invention.

In a filling nozzle 11 of FIG. 2b, a filling port 15 is provided continuously to a lower end 14 of a nozzle body 12. Here, a tubular passage 13 is in a shape having an inner diameter increasing in a downstream to upstream direction. A passage 19 of the filling port 15 is in a shape having, in a connecting portion to the tubular passage, an inner diameter larger than an inner diameter of the tubular passage in the connecting portion to the passage. A solution flowing through the tubular passage 13 of the nozzle body 12 is supplied into a vessel through the passage 19 of the filling port 15. Herein, when the inner diameter of a tubular passage and/or a passage is not constant, the inner diameters of the tubular passage and the passage are compared in the connecting portion therebetween, or in a connecting portion of the tubular passage or the passage to an inclined portion unless otherwise mentioned.

Figure 3:
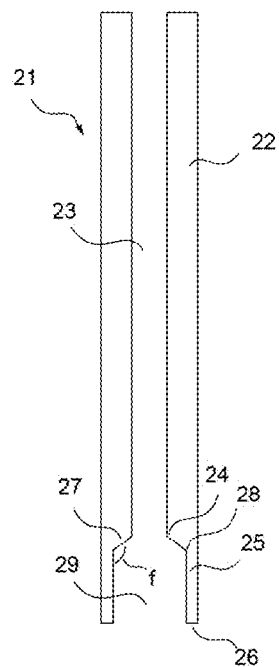
FIG. 3 is a schematic cross-sectional view of an example of a filling nozzle according to an embodiment of the present invention.

In a filling nozzle 12 of FIG. 3, a tubular passage 23 of a nozzle body 22 and a passage 29 of a filling port 25 are linked to each other via an inclined portion 27. In the cross-sectional view, an angle (f) between a surface of the inclined portion and a surface of the passage continuous thereto may be about 90 degrees (FIG. 2a, FIG. 2b), 90 degrees or more (FIG. 3), or less than 90 degrees. For example, the angle f may be 10 to 170 degrees, specifically 45 to 170 degrees, and more specifically 90 to 135 degrees.

Figure 4:
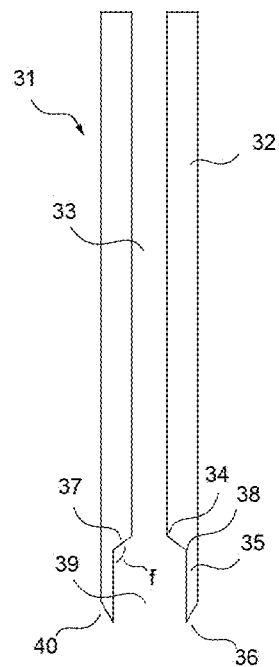
FIG. 4 is a schematic cross-sectional view of an example of a filling nozzle according to an embodiment of the present invention.

In a filling nozzle 31 of FIG. 4, a tubular passage 33 of a nozzle body 32 and a passage 39 of a filling port 35 are linked to each other via an inclined portion 37. In the cross-sectional view, an angle (f) between a surface of the inclined portion and a surface of the passage continuous thereto is the same as that described with reference to FIG. 3. An angle between a lower end surface 40 of the filling port and a vertical direction to the nozzle length direction is an angle exceeding 0 degrees, and an angle between the surface of the passage and the lower end surface of the filling port is less than 90 degrees.

The filling nozzle of the present invention is used for filling a pharmaceutical solution in a vessel to be used for a pharmaceutical, such as a vial, a syringe, a cartridge, an ampoule, a bag, a bottle, a pot, a tube, a jar, a capsule, an elastomeric reservoir, or a device. Usually, an amount of the pharmaceutical solution to be filled in the vessel is, for example, 0.01 to 1000 mL, specifically 0.1 to 50 mL, and more specifically 0.1 to 20 mL. The filling nozzle of the present invention can be used preferably for filling a pharmaceutical solution in a vial. An amount of the pharmaceutical solution to be filled here is, for example, 0.05 to 100 mL, specifically 0.1 to 50 mL, and more specifically 0.1 to 20 mL. The filling nozzle of the present invention can be used preferably for filling a pharmaceutical solution in a syringe. An amount of the pharmaceutical solution to be filled here is, for example, 0.05 to 100 mL, specifically 0.1 to 5 mL, and more specifically 0.2 to 2.4 mL.

Figure 5A:
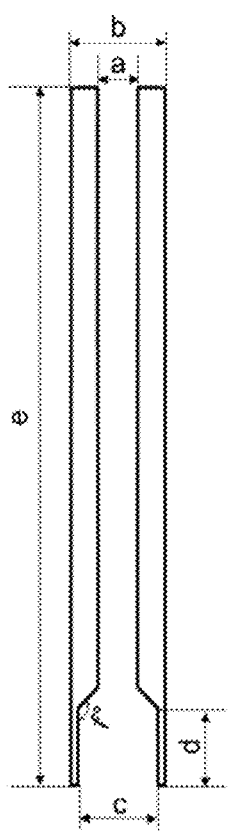
FIG. 5a is a schematic cross-sectional view of an example of the filling nozzle according to the embodiment of the present invention, and illustrates lengths and angles of portions corresponding to characteristics in the shape of the filling nozzle.

The dimensions of a filling nozzle of the present invention illustrated in FIG. 5a are not especially limited as long as they are suitable for filling a pharmaceutical solution. In this drawing, a reference character a denotes a diameter of a tubular passage of a nozzle body, a reference character b denotes an outer diameter of the nozzle body, a reference character c denotes a diameter of a passage of a filling port, a reference character d denotes a length of the passage of the filling port, a reference character e denotes a length of the entire filling nozzle, and a reference character f denotes an angle, in the cross-sectional view, between a surface of an inclined portion and a surface of a passage continuous thereto. Here, the diameter a is, for example, 0.5 to 10 mm, specifically 0.8 to 5.0 mm, and more specifically 1.0 to 3.0 mm. The diameter b is, for example, 0.6 to 12 mm, specifically 1.6 to 6.6 mm, and more specifically 2.6 to 3.6 mm. The diameter c is, for example, 0.6 to 11.5 mm, specifically 1.1 to 5.6 mm, and more specifically 1.2 to 3.6 mm. The length d is, for example, 0.1 to 10 mm, specifically 2 to mm, and more specifically 3 to 5 mm. The length e is, for example, 2 mm or more, specifically 2 to 300 mm, more specifically 10 to 200 mm, and further specifically 30 to 150 mm. The angle f may be about 90 degrees, may be 90 degrees or more, and may be less than 90 degrees. The angle f may be, for example, 10 to 170 degrees, specifically to 170 degrees, and more specifically 90 to 135 degrees.

Figure 5B:
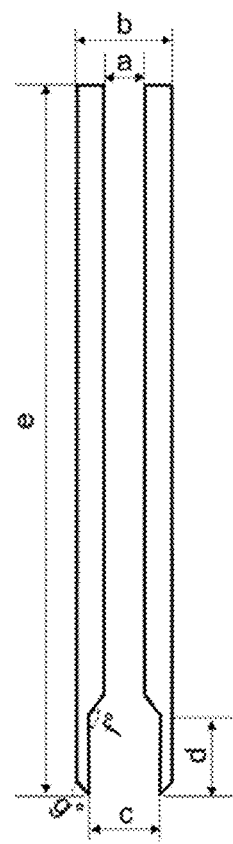
FIG. 5b is a schematic cross-sectional view of an example of the filling nozzle according to the embodiment of the present invention, and illustrates lengths and angles of portions corresponding to characteristics in the shape of the filling nozzle.

The filling nozzle of the present invention can be preferably used for filling a pharmaceutical solution in a vial. In this case, the diameter a is, for example, 0.5 to 5.0 mm, specifically 0.8 to 3.2 mm, and more specifically 0.8 to 2.6 mm. The diameter b is, for example, 0.6 to 6.0 mm, specifically 1.0 to 4.0 mm, and more specifically 1.0 to 3.2 mm. The diameter c is, for example, 0.6 to 5.8 mm, specifically 0.7 to 4.8 mm, and more specifically 0.9 to 3.2 mm. The length d is, for example, 0.1 to 10 mm, specifically 2 to 7 mm, and more specifically 3 to 5 mm. The length e is, for example, 2 mm or more, specifically 2 to 300 mm, more specifically 10 to 200 mm, and further specifically 30 to 150 mm A difference between the diameters c and a is, for example, to 5.0 mm, specifically 0.2 to 2.0 mm, and more specifically 0.2 to 0.6 mm A ratio d/c between the length d and the diameter c is, for example, 0.4 to 3.8, specifically 0.7 to 1.9, and more specifically 1.1 to 2.0. A difference between the diameters b and c is, for example, 5 mm or less, more specifically 3.0 to 0.1 mm, and more specifically 2.0 to 0.2 mm The filling nozzle of the present invention can be more preferably used for filling a pharmaceutical solution in a syringe. In this case, the diameter a is, for example, 0.5 to mm, specifically 0.8 to 3.2 mm, and more specifically 0.8 to 2.6 mm. The diameter b is, for example, 0.7 to 6.0 mm, specifically 1.0 to 4.0 mm, and more specifically 1.0 to 3.2 mm. The diameter c is, for example, 0.6 to 5.8 mm, specifically 0.7 to 4.8 mm, and more specifically 0.9 to 3.2 mm. The length d is, for example, 0.1 to 10 mm, specifically 2 to 7 mm, and more specifically 3 to 5 mm. The length e is, for example, 2 mm or more, specifically 2 to 300 mm, more specifically 10 to 200 mm, and further specifically 30 to 150 mm A difference between the diameters c and a is, for example, to 5.0 mm, specifically 0.2 to 2.0 mm, and more specifically 0.2 to 0.6 mm A ratio d/c between the length d and the diameter c is, for example, 0.4 to 3.8, specifically 0.7 to 1.9, and more specifically 1.1 to 2.0. A difference between the diameters b and c is, for example, 5 mm or less, more specifically 3.0 to 0.1 mm, and more specifically 2.0 to 0.2 mm The dimensions of a filling nozzle of the present invention illustrated in FIG. 5b are not especially limited as long as they are suitable for filling a pharmaceutical solution similarly to those of FIG. 5a. In FIG. 5b, a reference character a denotes a diameter of a tubular passage of a nozzle body, a reference character b denotes an outer diameter of the nozzle body, a reference character c denotes a diameter of a passage of a filling port, a reference character d denotes a length of the passage of the filling port, a reference character e denotes a length of the entire filling nozzle, a reference character f denotes an angle, in the cross-sectional view, between a surface of an inclined portion and a surface of a passage continuous thereto, and a reference character g denotes an angle of a surface of a lower end of the filling port (a lower end surface of the filling port) against the vertical direction along the nozzle length direction. Here, the diameter a is, for example, to 10 mm, specifically 0.8 to 5.0 mm, and more specifically 1.0 to 3.0 mm. The diameter b is, for example, 0.6 to 12 mm, specifically 1.6 to 6.6 mm, and more specifically 2.6 to 3.6 mm. The diameter c is, for example, 0.6 to 11.5 mm, specifically 1.1 to 5.6 mm, and more specifically 1.2 to 3.6 mm. The length d is, for example, 0.1 to mm, specifically 2 to 10 mm, and more specifically 3 to 5 mm. The length e is, for example, 2 mm or more, specifically 2 to 300 mm, more specifically 10 to 200 mm, and further specifically 30 to 150 mm. The angle f may be about 90 degrees, may be 90 degrees or more, and may be less than 90 degrees. For example, the angle f may be 10 to 170 degrees, specifically 45 to 170 degrees, and more specifically 90 to 135 degrees. The angle g of an outer surface between an end of the filling port and a surface continuous to a surface of the outer diameter is, for example, 0 to 75 degrees, specifically 0 to 60 degrees, more specifically 30 to 60 degrees, and further specifically, 45 to 60 degrees.

Figure 23A:
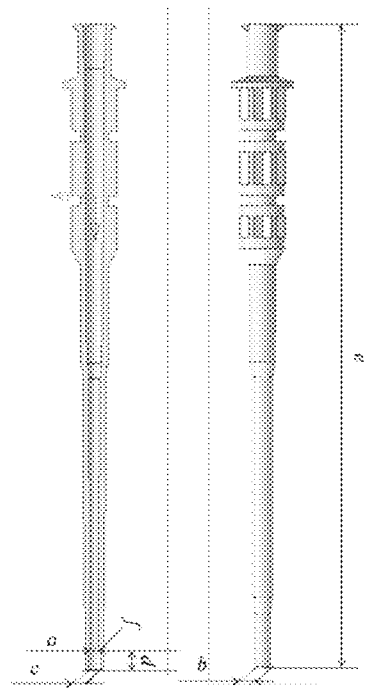
FIG. 23a is a schematic diagram and schematic cross-sectional view illustrating an example of the filling nozzle according to the embodiment of the present invention.

The dimensions of a filling nozzle of the present invention illustrated in FIG. 23a are not especially limited as long as they are suitable for filling a pharmaceutical solution similarly to those of FIG. 5b. In FIG. 23a, a reference character a denotes a diameter of a tubular passage of a nozzle body, a reference character b denotes an outer diameter of the nozzle body, a reference character c denotes a diameter of a passage of a filling port, a reference character d denotes a length of the passage of the filling port, a reference character e denotes a length of the entire filling nozzle, and a reference character f denotes an angle, in the cross-sectional view, between a surface of an inclined portion and a surface of a passage continuous thereto. Here, the diameter a is, for example, 0.5 to 10 mm, specifically 0.8 to 5.0 mm, and more specifically 1.0 to 3.0 mm. The diameter b is, for example, 0.6 to 12 mm, specifically 1.6 to 6.6 mm, and more specifically 2.6 to 3.6 mm. The diameter c is, for example, 0.6 to 11.5 mm, specifically 1.1 to 5.6 mm, and more specifically 1.2 to 3.6 mm. The length d is, for example, 0.1 to 10 mm, specifically 2 to 10 mm, and more specifically 3 to 5 mm. The length e is, for example, 2 mm or more, specifically 2 to 300 mm, more specifically 10 to 200 mm, and further specifically 30 to 150 mm. The angle f may be about 90 degrees, may be over 90 degrees, and may be less than 90 degrees. For example, the angle f may be 10 to 170 degrees, specifically 45 to 170 degrees, and more specifically 90 to 135 degrees. Further specifically, a=1.5 mm, b=3.2 mm, c=2.5 mm, d=3.5 mm, e=120 mm, and f=90 degrees. The diameter a is the inner diameter of the tubular passage of the nozzle body, and the inner diameter may be constant or varied in the whole tubular passage. For example, the tubular passage may have one or more portions having the inner diameter reducing in the downstream to upstream direction, and may have one or more portions having the inner diameter increasing in the downstream to the upstream direction. Specifically, in the portion having a reducing inner diameter in the tubular passage of the nozzle body, the inner diameter may be reduced in a tapered manner in the downstream to upstream direction by 10 degrees or less, 8 degrees or less, 5 degrees or less, 3 degrees or less, 2 degrees or less, 1 degree or less, 0.5 degrees or less, or 0.1 degrees or less. Preferably, in the portion having an increasing inner diameter in the tubular passage of the nozzle body, the inner diameter may be increased in a tapered manner in the downstream to upstream direction by 10 degrees or less, 8 degrees or less, degrees or less, 3 degrees or less, 2 degrees or less, 1 degree or less, 0.5 degrees or less, or 0.1 degrees or less. More preferably, the inner diameter of the tubular passage may be constant. In one aspect, in a part of the passage extending from the lower end of the nozzle body up to a position away therefrom by 20 mm or more, 30 mm or more, or 50 mm or more, the inner diameter is constant, or the passage has a portion having an increasing inner diameter in a tapered manner by 2 degrees or less, 1 degree or less, 0.5 degrees or less, or 0.1 degrees or less.

Figure 23B:
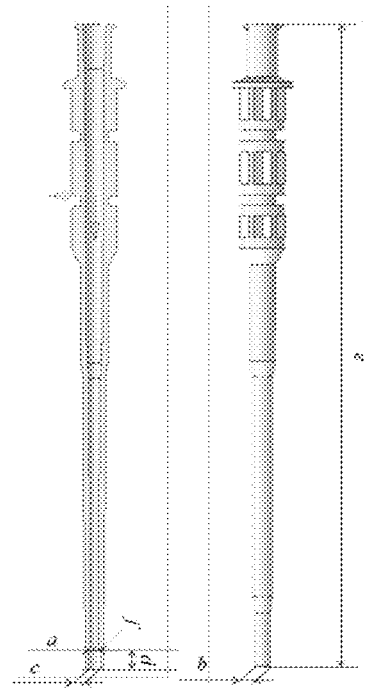
FIG. 23b is a schematic diagram and schematic cross-sectional view illustrating another example of the filling nozzle according to the embodiment of the present invention.
Figure 23C:
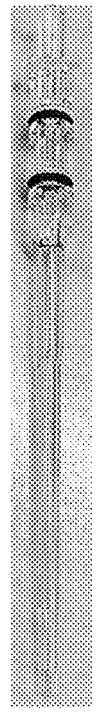
FIG. 23c is a photograph of a filling nozzle made of COP described as an example of the filling nozzle according to the embodiment of the present invention.

The dimensions of a filling nozzle of the present invention illustrated in FIG. 23b are not especially limited as long as it is suitable for filling a pharmaceutical solution similarly to those of FIG. 5-2. In FIG. 23a, a reference character a denotes a diameter of a tubular passage of a nozzle body, a reference character b denotes an outer diameter of the nozzle body, a reference character c denotes a diameter of a passage of a filling port, a reference character d denotes a length of the passage of the filling port, a reference character e denotes a length of the entire filling nozzle, and a reference character f denotes an angle, in the cross-sectional view, between a surface of an inclined portion and a surface of a passage continuous thereto. Here, the diameter a is, for example, 0.5 to 10 mm, specifically 0.8 to 5.0 mm, and more specifically 1.0 to 3.0 mm. The diameter b is, for example, 0.6 to 12 mm, specifically 1.6 to 6.6 mm, and more specifically 2.6 to 3.6 mm. The diameter c is, for example, 0.6 to 11.5 mm, specifically 1.1 to 5.6 mm, and more specifically 1.2 to 3.6 mm. The length d is, for example, 0.1 to mm, specifically 2 to 10 mm, and more specifically 3 to 5 mm. The length e is, for example, 2 mm or more, specifically 2 to 300 mm, more specifically 10 to 200 mm, and further specifically 30 to 150 mm. The angle f may be about 90 degrees, may be over degrees, and may be less than 90 degrees. For example, the angle f may be 10 to 170 degrees, specifically 45 to 170 degrees, and more specifically 90 to 135 degrees. Further specifically, a=1.5 mm, b=3.2 mm, c=2.5 mm, d=3.5 mm, e=120 mm, and f=112.5 degrees. The diameter a is the inner diameter of the tubular passage of the nozzle body, and the inner diameter may be constant or varied in the whole tubular passage. For example, the tubular passage may have one or more portions having the inner diameter reducing in the downstream to upstream direction, and may have one or more portions having the inner diameter increasing in the downstream to the upstream direction. Specifically, in the portion having a reducing inner diameter in the tubular passage of the nozzle body, the inner diameter may be reduced in a tapered manner in the downstream to upstream direction by 10 degrees or less, 8 degrees or less, 5 degrees or less, 3 degrees or less, 2 degrees or less, 1 degree or less, 0.5 degrees or less, or 0.1 degrees or less. Preferably, in the portion having an increasing inner diameter in the tubular passage of the nozzle body, the inner diameter may be increased in a tapered manner in the downstream to upstream direction by 10 degrees or less, 8 degrees or less, degrees or less, 3 degrees or less, 2 degrees or less, 1 degree or less, 0.5 degrees or less, or 0.1 degrees or less. More preferably, the inner diameter of the tubular passage may be constant. In one aspect, in a part of the passage extending from the lower end of the nozzle body up to a position away therefrom by 20 mm or more, 30 mm or more, or 50 mm or more, the inner diameter is constant, or the passage has a portion having an increasing inner diameter in a tapered manner by 2 degrees or less, 1 degree or less, 0.5 degrees or less, or 0.1 degrees or less.

In one aspect of the present invention, the filling nozzle is formed by using a resin selected from a cycloolefin polymer and a cycloolefin copolymer. In the filling nozzle according to this aspect, as compared with a filling nozzle formed by using stainless steel, polyether ether ketone (PEEK), or polypropylene, a ratio of nozzles in which the height of a lower end liquid surface of a pharmaceutical solution stagnating in the filling nozzle is 3 mm or more is high, and the lower end liquid surface of the pharmaceutical solution stagnating in the filling nozzle is in an upper position, and thus, solidification and clogging of a solution component can be prevented.

In one aspect of the present invention, the filling nozzle is formed by using a resin selected from a cycloolefin polymer and a cycloolefin copolymer and the inner diameter a of the tubular passage of the filling nozzle is 1 to 5 mm, and for example, a cycloolefin copolymer is used and the inner diameter a is 1.6 mm. In the filling nozzle according to this aspect, as compared with a filling nozzle of stainless steel, polyether ether ketone (PEEK), acrylic, or polypropylene, a ratio of nozzles in which the height of a lower end liquid surface of a pharmaceutical solution stagnating in the filling nozzle is 3 mm or more is high, and the lower end liquid surface of the pharmaceutical solution stagnating in the filling nozzle is in an upper position, and thus, solidification and clogging of a solution component can be prevented.

In one aspect of the present invention, when the filling nozzle has an inner diameter a of the tubular passage of 1 to 5 mm, the inner diameter c of the passage of the filling port is larger than the inner diameter a of the tubular passage by 0.2 mm to 2 mm, the length d of the passage is 1 to 10 mm, and the material used for forming the filling nozzle has a water contact angle of 50 degrees or more, and for example, when the inner diameter c of the passage of the filling port is larger than the inner diameter a of the tubular passage by 0.6 mm or more, and a material having a water contact angle of 50 degrees or more, specifically 58 degrees or more, more specifically 58 to 120 degrees, further specifically 80 to 100 degrees, and still further specifically 80 to 94 degrees is used, as compared with a filling nozzle having a tip not expanded, a ratio of nozzles in which the height of a lower end liquid surface of a pharmaceutical solution stagnating in the filling nozzle is 3 mm or more is high, and the lower end liquid surface of the pharmaceutical solution stagnating in the filling nozzle is in an upper position, and thus, solidification and clogging of a solution component can be prevented.

A material used for forming the filling nozzle of the present invention in the specific shape is not especially limited as long as it is suitable as a material for producing a production tool for a liquid pharmaceutical formulation. Examples include glass, a metal (such as stainless steel (SUS)), and a resin. Examples of the resin to be used as the material include polyether ether ketone (PEEK), an acrylic resin (such as polymethyl methacrylate (PMMA)), polypropylene (PP), a cycloolefin copolymer (COC), a cycloolefin polymer (COP), a fluorinated ethylene-propylene copolymer (FEP), polycarbonate (PC), polyethylene (PE), low density polyethylene (LDPE), high density polyethylene (HDPE), polyether sulfone (PES), polyethylene terephthalate (PET), polyolefin (PO), polyvinylidene fluoride (PVDF), polyvinyl chloride (PVC), polyvinyl alcohol (PVA), nylon, polylactic acid (PLA), polystyrene (PS), and ethylene tetrafluoride (Teflon(R)).

In one aspect of the present invention, the filling nozzle is formed by using a material having a water contact angle of 50 degrees or more, specifically 58 degrees or more, more specifically 58 to 120 degrees, further specifically 58 to 100 degrees, still further specifically 80 to 100 degrees, and particularly specifically 80 to 94 degrees. The material may be controlled in wettability thereof by modifying a surface thereof, coating the surface by a chemical treatment, forming fine irregularities on the surface, or forming a complex surface or the like, in such a manner that the water contact angle on the surface of the material can be 50 degrees or more, specifically 58 degrees or more, more specifically 58 to 120 degrees, further specifically 58 to 100 degrees, still further specifically 80 to 100 degrees, and particularly specifically 80 to 94 degrees. Here, the water contact angle can be measured by a usually employed sessile drop method (θ/2 method), for example, in accordance with a method of JIS R3257. The water contact angle can be measured by, for example, dropping 1 μL of water onto the material, and measuring, based on an image thereof, the size of a droplet thus obtained within 1 minute.

Examples of a preferable material of the filling nozzle of the present invention include a cycloolefin copolymer (COC), and a cycloolefin polymer (COP). Examples of the COC include a copolymer obtained from a raw material of an olefin of norbornene and ethylene (such as a norbornene-ethylene addition polymer containing a repeating unit derived from addition polymerization of norbornene), and a copolymer obtained from a raw material of an olefin of tetracyclododecene and ethylene (such as a norbornene-ethylene addition polymer containing a repeating unit derived from addition polymerization of tetracyclododecene). An example of the COP includes a hydrogenated product obtained by performing ring-opening polymerization of a cycloolefin ring-opening polymer and cycloolefin, and hydrogenating the resultant, more specifically, a hydrogenated product obtained by performing ring-opening polymerization of a ring-opening polymer of norbornene, and hydrogenating the resultant. Such COC and COP are described in, for example, Japanese Patent Laid-Open No. 5-300939 or Japanese Patent Laid-Open No. 5-317411. Structures of these preferable COC and COP are as follows:

Formula 1

(1) Example of COC (copolymer of tetracyclododecene and ethylene)

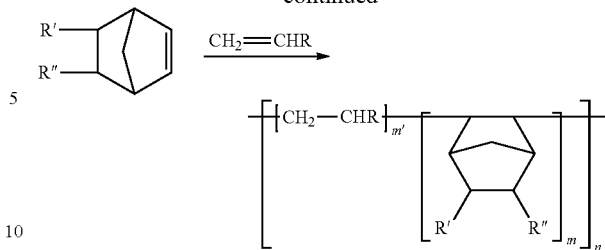

(2) Example of COC (copolymer of norbornene and olefin such as ethylene)

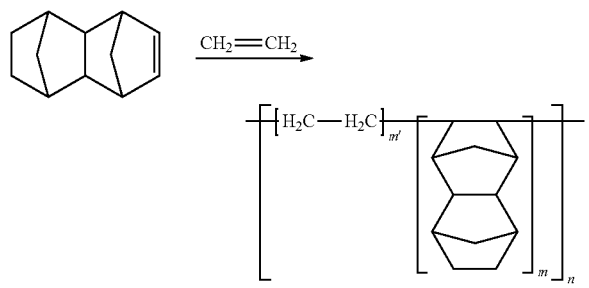

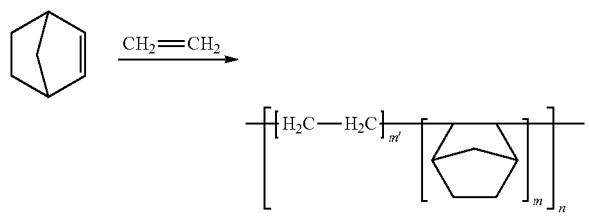

(3) Example of COP (hydrogenated product of ring-opening polymer of norbornene)

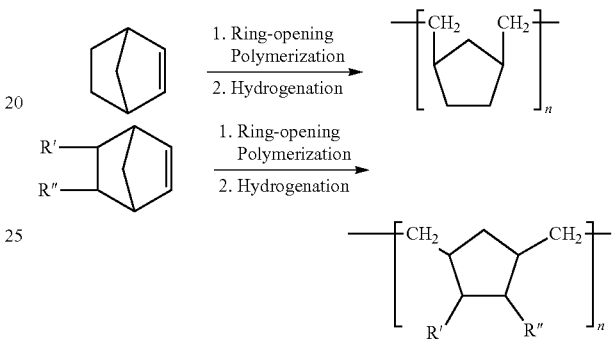

n. polymerization degree, m, m': copolymer content molar ratio

R: lower alkyl group, R', R": the same or different lower alkyl group

The cycloolefin used for producing COC or COP is not especially limited as long as it is a cyclic olefin having one or more double bonds and usable in producing a polymer. Examples of the cycloolefin include the above-described norbornene, and a norbornene having a substituent. Here, the lower alkyl group is a $C_m H_n$ group, and examples include $C_{1-6}$ alkyl, particularly $C_{1-4}$ alkyl, such as hydrogen, methyl, ethyl, propyl, isopropyl, n-butyl, sec-butyl, and t-butyl.

As the COC, for example, Optlet(R) available from Hitachi Chemical Company, Ltd., TOPAS(R) available from Polyplastics Co., Ltd., or APEL(R) available from Mitsui Chemicals, Inc. can be used. As the COP, for example, products commercially available as ZEONEX(R) or ZEONOR(R) from Zeon Corporation, as ARTON from JSR Corporation, and as Daikyo Resin CZ(R) from Daikyo Seiko, Ltd. can be used. The COC and COP are materials preferred because of their characteristics as a polyolefin resin in chemical properties such as heat resistance and light resistance, and chemical resistance, and their characteristics as an amorphous resin in physical properties such as a mechanical characteristic, a melt and flow characteristic, dimensional accuracy, and low dissolvability, and are materials preferable as a resin to be used for a filling nozzle for a pharmaceutical solution because of their properties such as a mechanical property, chemical resistance, precision moldability, high strength, low adsorption, low impurities, low hygroscopicity, sterilization resistance, a barrier property, and high transparency.

In one aspect of the present invention, the filling nozzle has an inner diameter a of the tubular passage of 0.5 to 2.0 mm, an outer diameter b of 0.7 to 4.0 mm, and a length e of 30 to 150 mm, and the material used for forming the filling nozzle is a resin material selected from a cycloolefin polymer and a cycloolefin copolymer. The outer diameter b is, for example, larger than the inner diameter a of the tubular passage by 0.2 to 2.0 mm In one aspect of the present invention, the filling nozzle has an inner diameter a of the tubular passage of 2.0 to 5.0 mm, an outer diameter b of 2.2 to 6.0 mm, and a length e of 30 to 150 mm, and the material used for forming the filling nozzle is a resin material selected from a cycloolefin polymer and a cycloolefin copolymer. The outer diameter b is, for example, larger than the inner diameter a of the tubular passage by 0.2 to 2.0 mm In one aspect of the present invention, the filling nozzle has an inner diameter a of the tubular passage of 0.5 to 1.0 mm and an outer diameter b of 0.8 to 2.0 mm, has an inner diameter c of the passage of the filling port larger than the inner diameter a of the tubular passage by 0.2 mm to 1.0 mm, specifically 0.2 to 0.8 mm, and more specifically to 0.6 mm, has a passage length d of 2 to 7 mm, specifically 2 to 5 mm, and more specifically 3 to 5 mm, and has a length e of 30 to 150 mm, an angle f of 90 to 135 degrees, and an angle g of 0 to 60 degrees, a material forming the filling nozzle has a water contact angle of 50 degrees or more, specifically 58 degrees or more, more specifically 58 to 120 degrees, further specifically 80 to 100 degrees, still further specifically 80 to 94 degrees, and the material is particularly specifically a cycloolefin polymer or a cycloolefin copolymer.

In one aspect of the present invention, the filling nozzle has an inner diameter a of the tubular passage of 1.0 to 2.0 mm and an outer diameter b of 1.4 to 3.0 mm, has an inner diameter c of the passage of the filling port larger than the inner diameter a of the tubular passage by 0.2 mm to 1.0 mm, specifically 0.2 to 0.8 mm, and more specifically to 0.6 mm, has a passage length d of 2 to 7 mm, specifically 2 to 5 mm, and more specifically 3 to 5 mm, and has a length e of 30 to 150 mm, an angle f of 90 to 135 degrees, and an angle g of 0 to 60 degrees, a material forming the filling nozzle has a water contact angle of 50 degrees or more, specifically 58 degrees or more, more specifically 58 to 120 degrees, further specifically 80 to 100 degrees, still further specifically 80 to 94 degrees, and the material is particularly specifically a cycloolefin polymer or a cycloolefin copolymer.

In one aspect of the present invention, the filling nozzle has an inner diameter a of the tubular passage of 1.5 to 2.0 mm and an outer diameter b of 2.0 to 3.0 mm, has an inner diameter c of the passage of the filling port larger than the inner diameter a of the tubular passage by 0.2 mm to 1.0 mm, specifically 0.2 to 0.8 mm, and more specifically to 0.6 mm, has a passage length d of 2 to 7 mm, specifically 2 to 5 mm, and more specifically 3 to 5 mm, and has a length e of 30 to 150 mm, an angle f of 90 to 135 degrees, and an angle g of 0 to 60 degrees, a material forming the filling nozzle has a water contact angle of 50 degrees or more, specifically 58 degrees or more, more specifically 58 to 120 degrees, further specifically 80 to 100 degrees, still further specifically 80 to 94 degrees, and the material is particularly specifically a cycloolefin polymer or a cycloolefin copolymer.

In one aspect of the present invention, the filling nozzle has an inner diameter a of the tubular passage of 2.0 to 3.0 mm and an outer diameter b of 2.4 to 4.0 mm, has an inner diameter c of the passage of the filling port larger than the inner diameter a of the tubular passage by 0.2 mm to 1.0 mm, specifically 0.2 to 0.8 mm, and more specifically to 0.6 mm, has a passage length d of 2 to 7 mm, specifically 2 to 5 mm, and more specifically 3 to 5 mm, and has a length e of 30 to 150 mm, an angle f of 90 to 135 degrees, and an angle g of 0 to 60 degrees, a material forming the filling nozzle has a water contact angle of 50 degrees or more, specifically 58 degrees or more, more specifically 58 to 120 degrees, further specifically 80 to 100 degrees, still further specifically 80 to 94 degrees, and the material is particularly specifically a cycloolefin polymer or a cycloolefin copolymer.

In one aspect of the present invention, the filling nozzle has an inner diameter a of the tubular passage of 3.0 to 4.0 mm and an outer diameter b of 3.4 to 5.0 mm, has an inner diameter c of the passage of the filling port larger than the inner diameter a of the tubular passage by 0.2 mm to 1.0 mm, specifically 0.2 to 0.8 mm, and more specifically to 0.6 mm, has a passage length d of 2 to 7 mm, specifically 2 to 5 mm, and more specifically 3 to 5 mm, and has a length e of 30 to 150 mm, an angle f of 90 to 135 degrees, and an angle g of 0 to 60 degrees, the material forming the filling nozzle has a water contact angle of 50 degrees or more, specifically 58 degrees or more, more specifically 58 to 120 degrees, further specifically 80 to 100 degrees, still further specifically 80 to 94 degrees, and the material is particularly specifically a resin material selected from a cycloolefin polymer and a cycloolefin copolymer.

In one aspect of the present invention, the filling nozzle has an inner diameter a of the tubular passage of 4.0 to 5.0 mm and an outer diameter b of 4.4 to 6.5 mm, has an inner diameter c of the passage of the filling port larger than the inner diameter a of the tubular passage by 0.2 mm to 1.5 mm, specifically 0.4 to 1.0 mm, and more specifically 0.5 to 0.8 mm, has a passage length d of 3 to 7 mm, and more specifically 3 to 5 mm, and has a length e of 30 to 150 mm, an angle f of 90 to 135 degrees, and an angle g of 0 to 60 degrees, the material forming the filling nozzle has a water contact angle of 50 degrees or more, specifically 58 degrees or more, more specifically 58 to 120 degrees, further specifically 80 to 100 degrees, still further specifically 80 to 94 degrees, and the material is particularly specifically a cycloolefin polymer or a cycloolefin copolymer.

Figure 6:
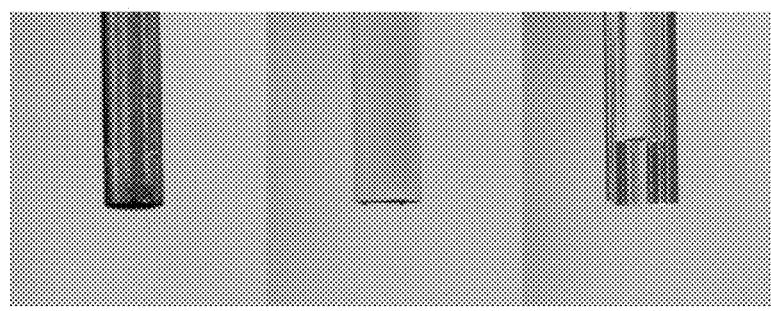
FIG. 6 is an enlarged photograph of portions in the vicinity of filling ports of filling nozzles made of stainless steel (a), PEEK (b), and COC (c).

In one aspect of the present invention, a transparent resin is used as the material of the filling nozzle. FIG. 6 illustrates enlarged photographs of portions in the vicinity of filling ports of filling nozzles respectively made of stainless steel (a), PEEK (b), and COC (c). When a filling nozzle formed from a transparent resin is used, visibility of a liquid surface height in a tube and a filling port of the filling nozzle can be improved, and hence if dripping at the tip of the filling nozzle or liquid stagnation occurs, it can be easily and early detected visually, so that clogging and lowering of filling accuracy caused by the dripping at the tip of the filling nozzle, the liquid stagnation, and drying of the tip of the filling nozzle can be effectively prevented.

In the present invention, the pharmaceutical solution is not especially limited, and may contain, as an active ingredient, a low molecular weight compound, a protein (such as an antibody or a fragment thereof), a peptide, or a nucleic acid. In general, the concentration of an active ingredient in a liquid pharmaceutical formulation is, for example, 0.001 to 1000 mg/mL, specifically 0.01 to 300 mg/mL, and more specifically 1 to 200 mg/mL. In general, the viscosity of the pharmaceutical solution to be filled is, for example, 1 to 2000 mPa·s (1 to 2000 cP), and specifically 1 to 100 mPa·s. Herein, a viscosity is expressed as a value measured by an electromagnetically spinning viscometer method (Journal of Artificial Organs (2013) Sep; 16, (3): 359-367). In general, the surface tension of the pharmaceutical solution to be filled is, for example, 30 to 72 mN/m, specifically 35 to 50 mN/m, more specifically 40 to 50 mN/m, and further specifically 45 to 50 mN/m. Herein, the surface tension is expressed as a value measured by an ordinary plate method, and the measurement can be performed by reading a force for pulling a measurement plate into a liquid by surface tension acting along the periphery of the measurement plate when the measurement plate comes into contact with the liquid surface.

In one aspect of the present invention, the pharmaceutical solution contains a bioactive protein as the active ingredient. An example of the bioactive protein includes an antibody. In a preferable aspect, the present invention is applied to production of an antibody-containing liquid pharmaceutical formulation containing a high concentration of an antibody.

In the present invention, the concentration of an antibody is, for example, 50 mg/mL or more, specifically 80 mg/mL or more, more specifically 100 mg/mL or more, further preferably 120 mg/mL or more, and still further specifically 150 mg/mL or more. Besides, an upper limit of the concentration of the antibody in an antibody-containing liquid formulation is, for example, 1000 mg/mL, specifically 600 mg/mL, more specifically 400 mg/mL, further specifically 350 mg/mL, and particularly specifically 200 mg/mL. Therefore, the concentration of the antibody in a high-concentration antibody solution is, for example, 50 to 1000 mg/mL, specifically 100 to 350 mg/mL, further specifically 120 to 250 mg/mL, and particularly specifically 150 to 240 mg/mL. In general, in filling a solution having a concentration of a protein such as an antibody of 100 mg/mL or more, or 120 mg/mL or more, or a solution having a viscosity of 4 mPa·s or more, or 6 mPa·s or more, solidification of a component at a tip of a nozzle due to drying, and clogging derived from the solidification easily occur, which increases occurrence of problems in production.

The antibody to be used in the present invention is not especially limited as long as it binds to a desired antigen, may be a polyclonal antibody or a monoclonal antibody, and is preferably a monoclonal antibody from the viewpoint that a homogeneous antibody can be stably produced.

The monoclonal antibody to be used in the present invention embraces not only monoclonal antibodies derived from animals such as a human, a mouse, a rat, a hamster, a rabbit, a sheep, a camel, and a monkey but also gene recombinant antibodies obtained by artificial modification, such as a chimeric antibody, a humanized antibody, and a bispecific antibody. The monoclonal antibody further embraces a gene recombinant antibody obtained by artificially modifying a constant region or the like of an antibody for modifying physical properties of an antibody molecule (specifically, modifying an isoelectric point (pI), modifying affinity of an Fc receptor, or the like) for purposes of improving retention in blood or in vivo kinetics. Besides, an immunoglobulin class of the antibody to be used in the present invention is not especially limited, may be any of classes including IgG, such as IgG1, IgG2, IgG3, or IgG4, IgA, IgD, IgE and IgM, and is preferably IgG or IgM.

Besides, the antibody to be used in the present invention embraces not only an antibody (full length antibody) having a constant region and a variable region but also an antibody fragment such as Fv, Fab, or F(ab)2, a low molecular weight antibody such as a monovalent, or di- or higher valent single-stranded Fv (scFv, sc(FV)2) in which a variable region of an antibody is linked with a linker such as a peptide linker, or a diabody such as an scFv dimer, and the like, and is preferably a full length antibody.

The antibody to be used in the present invention can be produced by a method known to those skilled in the art. A hybridoma producing the monoclonal antibody can be produced basically by employing known techniques as follows: A desired antigen or a cell expressing the desired antigen is used as a sensitizing antigen to be immunized by a usual immunization method. The thus obtained immune cell is fused with a known parent cell by a usual cell fusion method for screening a monoclonal antibody-producing cell (hybridoma) by a usual screening method. The production of a hybridoma can be performed, for example, in accordance with a method of Milstein et al., (Kohler. G. and Milstein, C., Methods Enzymol. (1981) 73: 3-46) or the like. If immunogenicity of the antigen is low, the antigen may be bound to a macromolecule having immunogenicity such as albumin before the immunization.

Alternatively, a gene recombinant antibody produced by employing gene recombination technology for cloning an antibody gene from a hybridoma to be incorporated into an appropriate vector, and introducing a host into the resultant can be used (see, for example, Carl, A. K. Borrebaeck, James, W. Larrick, THERAPEUTIC MONOCLONAL ANTIBODIES, Published in the United Kingdom by MACMILLAN PUBLISHERS LTD., 1990). Specifically, a cDNA of a variable region (V region) of an antibody is synthesized from an mRNA of a hybridoma by using a reverse transcriptase. When a DNA encoding a V region of a desired antibody is obtained, this DNA is linked to a DNA encoding a constant region (C region) of the desired antibody, and the resultant is incorporated into an expression vector. Alternatively, the DNA encoding the V region of the antibody may be incorporated into an expression vector including the DNA of the C region of the antibody. The DNA is incorporated into an expression vector so as to express in an expression control region, for example, under control of an enhancer or a promotor. Next, this expression vector is used to transform a host cell, and thus, the antibody can be expressed.

In the present invention, a gene recombinant antibody, such as a chimeric antibody or a humanized antibody, obtained by artificial modification performed for purposes of, for example, lowering heteroantigenicity against a human can be used. Such a modified antibody can be produced by a known method. A chimeric antibody is an antibody composed of a variable region of a heavy chain or light chain of an antibody of a mammal excluding a human, such as a mouse antibody, and a constant region of a heavy chain or light chain of a human antibody, and can be obtained by linking a DNA encoding the variable region of the mouse antibody to a DNA encoding the constant region of the human antibody, and introducing the resultant into an expression vector to be introduced into a host for the production.

Besides, the antibody to be used in the present invention embraces antibody modifications. For example, an antibody bound to any of various molecules such as polyethylene glycol (PEG) and a cytotoxic drug can be used (Farmaco. 1999 Aug. 30; 54(8): 497-516, Cancer J. 2008 May-Jun; 14(3): 154-69). The antibody to be used in the present invention embraces such antibody modifications. The antibody modifications can be obtained by chemically modifying an antibody. A method to be employed for this purpose has been already established in this field.

Examples of the antibody to be used in the present invention include, but are not limited to, an anti-tissue factor antibody, an anti-IL-6 receptor antibody, an anti-IL-6 antibody, an anti-glypican-3 antibody, an anti-CD3 antibody, an anti-CD20 antibody, an anti-GPIIb/IIIa antibody, an anti-TNF antibody, an anti-CD25 antibody, an anti-EGFR antibody, an anti-Her2/neu antibody, an anti-RSV antibody, an anti-CD33 antibody, an anti-CD52 antibody, an anti-IgE antibody, an anti-CD11a antibody, an anti-VEGF antibody, an anti-VLA4 antibody, an anti-HM1.24 antigen antibody, an anti-parathyroid hormone-related peptide antibody (anti-PTHrP antibody), an anti-ganglioside GM3 antibody, an anti-TPO receptor agonist antibody, an antibody substituting for blood coagulation factor VIII, an anti-IL31 receptor antibody, an anti-HLA antibody, an anti-AXL antibody, an anti-CXCR4 antibody, an anti-NR10 antibody, and a bispecific antibody of factor IX and factor X.

An example of the antibody to be used in the present invention includes a rearranged humanized antibody, and examples of this antibody include a humanized anti-interleukin 6 (IL-6) receptor antibody (tocilizumab, hPM-1 or MRA, see WO92/19759), a humanized anti-HM1.24 antigen monoclonal antibody (see WO98/14580), a humanized parathyroid hormone-related peptide antibody (anti-PTHrP antibody) (see WO98/13388), a humanized anti-tissue factor antibody (see WO99/51743), an anti-glypican-3 humanized IgGlx antibody (codrituzumab, GC33, see WO2006/006693), an anti-NR10 humanized antibody (see WO2009/072604), a bispecific humanized antibody of factor IX and factor X (ACE910, see WO2012/067176), and an anti-IL-31 receptor A humanized monoclonal antibody nemolizumab (CIM331) antibody. Examples of the humanized antibody to be used in the present invention include a humanized anti-IL-6 receptor antibody, an anti-NR10 humanized antibody, a bispecific humanized antibody of factor IX and factor X, a humanized anti-myostatin antibody, a humanized IL-8 antibody, and an anti-IL-31 receptor A humanized monoclonal antibody nemolizumab (CIM331) antibody.

An example of a human IgM antibody includes an anti-ganglioside GM3 recombinant human IgM antibody (see WO05/05636).

Examples of the low molecular weight antibody include an anti-TPO receptor agonist diabody (see WO02/33072), and an anti-CD47 antagonist diabody (see WO01/66737).

An antibody having a low isoelectric point (low pI antibody) herein refers to an antibody having a low isoelectric point that is difficult to naturally exist. The isoelectric point of such an antibody can be, but is not limited to, for example, 3.0 to 8.0, preferably to 7.5, more preferably 5.0 to 7.0, and particularly preferably 5.0 to 6.5. It is presumed that a natural (or usual) antibody usually has an isoelectric point in a range of 7.5 to 9.5.

As the antibody to be used in the present invention, a pI modified antibody having a pI lowered by modifying an amino acid residue exposed on the surface of the antibody is preferred. Such a pI modified antibody refers to an antibody having a pI lowered by 1 or more, preferably 2 or more, and more preferably 3 or more as compared with that of an antibody before the modification. Examples of the pI modified antibody include, but are not limited to, an anti-IL-6 receptor antibody SA237 described in WO2009/041621 (MAb1, H chain/SEQ ID NO: 1, L chain/SEQ ID NO: 2), and a fully humanized NS22 antibody, that is, an anti-NR10 humanized antibody, produced by a method described in Example 12 of WO2009/072604.

When the active ingredient of the pharmaceutical solution is an antibody, the viscosity of the pharmaceutical solution to be filled is, for example, 1 to 2000 mPa·s (1 to 2000 cP), specifically 1 to 1000 mPa·s, more specifically 4 to 1000 mPa·s, further specifically 4 to 200 mPa·s, particularly specifically 6 to 100 mPa·s, and further particularly specifically 6 to 50 mPa·s. Herein, the viscosity is expressed as a value measured by an electromagnetically spinning viscometer method (Journal of Artificial Organs (2013) Sep; 16, (3): 359-367). In general, the surface tension of the pharmaceutical solution to be filled is, for example, 30 to 72 mN/m, specifically 35 to 50 mN/m, and more specifically 45 to 50 mN/m. Herein, the surface tension is expressed as a value measured by an ordinary plate method, and the measurement can be performed by reading a force for pulling a measurement plate into a liquid by surface tension acting along the periphery of the measurement plate when the measurement plate comes into contact with the liquid surface.

In the present invention, the pharmaceutical solution can appropriately contain, if necessary, a surfactant, a suspending agent, a dissolution assisting agent, a tonicity agent, a preservative, an adsorption inhibitor, a diluent, an excipient, a pH adjuster, a soothing agent, a sulfur-containing reducing agent, an antioxidant, a stabilizer, an emulsifier, a sugar, an amino acid, and the like.

Representative examples of the surfactant include nonionic surfactants, for example, sorbitan fatty acid esters, such as sorbitan monocaprylate, sorbitan monolaurate, and sorbitan monopalmitate; glycerin fatty acid esters, such as glycerin monocaprylate, glycerin monomilitate, and glycerin monostearate; polyglycerin fatty acid esters such as decaglyceryl monostearate, decaglyceryl distearate, and decaglyceryl monolinoleate; polyoxyethylene sorbitan fatty acid esters, such as polyoxyethylene sorbitan monolaurate, polyoxyethylene sorbitan monooleate, polyoxyethylene sorbitan monostearate, polyoxyethylene sorbitan monopalmitate, polyoxyethylene sorbitan trioleate, and polyoxyethylene sorbitan tristearate; polyoxyethylene sorbit fatty acid esters, such as polyoxyethylene sorbit tetrastearate, a block copolymer containing a polyoxypropylene chain and a polyoxyethylene chain such as a poloxamer, and polyoxyethylene sorbit tetraoleate; polyoxyethylene glycerin fatty acid esters such as polyoxyethylene glyceryl monostearate; polyethylene glycol fatty acid esters such as polyethylene glycol distearate; polyoxyethylene alkyl ethers such as polyoxyethylene lauryl ether; polyoxyethylene polyoxypropylene alkyl ethers, such as polyoxyethylene polyoxypropylene glycol ether, polyoxyethylene polyoxypropylene propyl ether, and polyoxyethylene polyoxypropylene cetyl ether; polyoxyethylene alkyl phenyl ethers such as polyoxyethylene nonyl phenyl ether; polyoxyethylene hardened castor oils, such as polyoxyethylene castor oil, and polyoxyethylene hardened castor oil (polyoxyethylene hydrogen castor oil); polyoxyethylene beeswax derivatives such as polyoxyethylene sorbit beeswax; polyoxyethylene lanolin derivatives such as polyoxyethylene lanolin; polyoxyethylene fatty acid amides having HLB of 6 to 18, such as polyoxyethylene stearic acid amide; anionic surfactants, for example, alkyl sulfates containing an alkyl group having 10 to 18 carbon atoms, such as sodium cetyl sulfate, sodium lauryl sulfate, and sodium oleyl sulfate; polyoxyethylene alkyl ether sulfates having an average addition mole number of ethylene oxide of 2 to 4, and including an alkyl group having 10 to 18 carbon atoms, such as sodium polyoxyethylene lauryl sulfate; alkyl sulfosuccinate salts containing an alkyl group having 8 to 18 carbon atoms, such as sodium lauryl sulfosuccinate ester; natural surfactants, such as lecithin, and glycerophospholipid; sphingophospholipid such as sphingomyelin; and sucrose fatty acid esters of fatty acids having 12 to 18 carbon atoms.

Examples of the suspending agent include methyl cellulose, polysorbate 80, polysorbate 20, hydroxyethyl cellulose, gum arabic, powdered tragacanth, sodium carboxymethyl cellulose, and polyoxyethylene sorbitan monolaurate.

Examples of the dissolution assisting agent include polyoxyethylene hardened castor oil, polysorbate 80, polysorbate 20, nicotinic acid amide, polyoxyethylene sorbitan monolaurate, macrogol, and castor oil fatty acid ethyl ester.

Examples of the tonicity agent include sodium chloride, potassium chloride, and calcium chloride.

Examples of the preservative include methyl parahydroxybenzoate, ethyl parahydroxybenzoate, sorbic acid, phenol, cresol, and chlorocresol.

Examples of the adsorption inhibitor include human serum albumin, lecithin, dextran, an ethylene oxide-propylene oxide copolymer, hydroxypropyl cellulose, methyl cellulose, polyoxyethylene hardened castor oil, polyethylene glycol, polysorbate 80, polysorbate 20, and poloxamer 188.

Examples of the pH adjuster include citric acid, gluconic acid, lactic acid, tartaric acid, acetic acid, phosphoric acid, fumaric acid, maleic acid, adipic acid, glacial acetic acid, succinic acid, malic acid, α-ketoglutaric acid, sodium carbonate, sodium bicarbonate, sodium lactate, sodium acetate, sodium citrate, trisodium citrate, sodium gluconate, sodium phosphate, sodium hydrogen phosphate, disodium hydrogen phosphate, hydrochloric acid, sodium chloride, and sodium hydroxide.

Examples of the sulfur-containing reducing agent include N-acetyl cysteine, N-acetyl homocystein, thioctic acid, thiodiglycol, thioethanolamine, thioglycerol, thiosorbitol, thioglycolic acid and a salt thereof, sodium thiosulfate, glutathione, and an agent having a sulfhydryl group such as thioalkanoic acid having 1 to 7 carbon atoms.

Examples of the antioxidant include erythorbic acid, dibutyl hydroxytoluene, butyl hydroxyanisole, α-tocopherol, tocopherol acetate, L-ascorbic acid and a salt thereof, L-ascorbic acid palmitate, L-ascorbic acid stearate, sodium hydrogen sulfite, sodium sulfite, triamyl gallate, propyl gallate, and a chelating agent such as disodium ethylenediamine tetraacetate (EDTA), sodium pyrophosphate, and sodium metaphosphate.

Examples of the sugar include sucrose, trehalose, meglumine, sorbitol, mannitol, and erythritol.

Examples of the amino acid include histidine, tryptophan, methionine, leucine, phenylalanine, serin, glutamic acid, arginine, aspartic acid, and lysine.

In the present invention, examples of the pharmaceutical solution include ACTEMRA(R) Syringe for Subcutaneous Injection 162 mg, ACTEMRA(R) Auto-injector for Subcutaneous Injection 162 mg, ILARIS(R) solution for s.c. injection 150 mg, ORENTIA(R) Syringe for s.c. injection 125 mg, ORENTIA(R) Auto-injector for s.c. injection 125 mg, KEVZARA(R) s.c. injection 150 mg, KEVZARA(R) s.c. injection 200 mg, Cosentyx(R) for s.c. injection 150 mg pen, Cosentyx(R) for s.c. injection 150 mg syringe, Cimzia(R) 200 mg syringe for s.c. injection, Simponi(R) syringe for subcutaneous injection 50 mg, Xolair(R) for s.c. injection 75 mg, Xolair(R) for s.c. injection 150 mg, Dupixent(R) 300 mg syringe, Tremfya(R) subcutaneous injection 100 mg syringe, Praluent(R) s.c. injection 150 mg syringe, HEMLIBRA(R) 150 mg for SC Injection, HEMLIBRA(R) 105 mg for SC Injection, HEMLIBRA(R) 90 mg for SC Injection, HEMLIBRA(R) 60 mg for SC Injection, Benlysta(R) for S.C. injection 200 mg syringe, Benlysta(R) for S.C. injection 200 mg auto-injector, Repatha(R) SC Injection 140 mg Syringe, and Repatha(R) SC Injection 140 mg Pen.

In the present invention, the pharmaceutical solution is filled in a vessel such as a vial, a syringe, a cartridge, an ampoule, a bag, a bottle, a pot, a tube, a jar, a capsule, an elastomeric reservoir, or a device. In general, a rate for filling the pharmaceutical solution in one vessel is, for example, 1 to 1000 mL/min, specifically 5 to 300 mL/min, and more specifically 20 to 200 mL/min. The production of the pharmaceutical formulation is performed under a clean room environment, or a clean environment where air cleanliness is controlled as in a clean booth facility or an isolator facility.

In one aspect of the present invention, the liquid pharmaceutical formulation is in the form of a vial, and the pharmaceutical solution is filled in the vial. In general, a vial holds the pharmaceutical solution in a cylindrical portion thereof. The diameter in the peripheral cross-section of the cylindrical portion is, for example, 1 to 100 mm, specifically 16 to 47 mm, and more specifically 18.1 to 30 mm A length of the cylindrical portion is, for example, 5 to 150 mm, specifically 35 to 100 mm, and more specifically 33 to 60 mm. When the present invention is applied to the production of a liquid pharmaceutical formulation in the form of a vial, the rate for filling the pharmaceutical solution in one vessel is, for example, 1 to 1000 mL/min, specifically 15 to 200 mL/min, and more specifically 20 to 150 mL/min.

In one aspect of the present invention, the liquid pharmaceutical formulation is in the form of a pre-filled syringe, and the pharmaceutical solution is filled in a syringe. In general, a syringe holds the pharmaceutical solution in a cylindrical portion thereof. The diameter in the peripheral cross-section of the cylindrical portion is, for example, 1 to 30 mm, specifically 6.75 to 22.25 mm, and more specifically 8.05 to 11.05 mm. The inner diameter of the cylindrical portion is, for example, 0.9 to 29.9 mm, specifically 4.55 to 19.25 mm, and more specifically 6.25 to 8.85 mm. The length of the cylindrical portion is, for example, 5 to 200 mm, specifically 47.1 to 97.55 mm, and more specifically 53.5 to 54.9 mm. When the present invention is applied to the production of the liquid pharmaceutical formulation in the form of a pre-filled syringe, the rate for filling the pharmaceutical solution in one vessel is, for example, 1 to 300 mL/min, specifically 15 to 200 mL/min, and more specifically 20 to 100 mL/min.

When the present invention is applied to the production of a liquid pharmaceutical formulation in the form of a vial, the amount of the pharmaceutical solution to be filled in the vessel is, for example, 0.05 to 500 mL, specifically 0.1 to 123 mL, and more specifically 0.2 to 20 mL. The pharmaceutical solution is filled in the vessel with an opening of the cylindrical portion of the vessel facing upward. The length from the bottom of the cylindrical portion to a liquid surface of the pharmaceutical solution is, for example, 0.5 to 150 mm, specifically 1 to 100 mm, and more specifically 5 to 60 mm When the present invention is applied to the production of a liquid pharmaceutical formulation in the form of a pre-filled syringe, the amount of the pharmaceutical solution to be filled in the vessel is, for example, 0.05 to 100 mL, specifically 0.1 to 5 mL, and more specifically 0.2 to 2.4 mL. The pharmaceutical solution is filled in the vessel with an opening of the cylindrical portion of the vessel facing upward. The length from the bottom of the cylindrical portion to a liquid surface of the pharmaceutical solution is, for example, 0.5 to 150 mm, specifically 1 to 100 mm, and more specifically 5 to 60 mm In the present invention, the production of the liquid pharmaceutical formulation is performed by extruding the pharmaceutical solution into a filling tube by using a pump, and filling the pharmaceutical solution into a vessel through a filling nozzle disposed on the downstream side. In this filling step, a general filling apparatus, such as a liquid filling apparatus manufactured by Groninger, a liquid filling apparatus manufactured by Bosch, a liquid filling apparatus manufactured by Bausch, a liquid filling apparatus manufactured by Optima, a liquid filling apparatus manufactured by K. T. Mfg. Co., Ltd., a liquid filling apparatus manufactured by Vanrx, a liquid filling apparatus manufactured by GEA, a liquid filling apparatus manufactured by Shibuya Corporation, and the like can be used, and alternatively, a commercially available apparatus, such as MLF 4000 (manufactured by Bosch), FLS 3000 (manufactured by Bosch), FMB210 (manufactured by Watson-Marlow), liquid filling apparatuses of INOVA series (manufactured by OPTIMA), and SA25 (manufactured by Vanrx) can be used. As the filling pump, a syringe pump, a pinch valve pump, a weight filling pump, a mass flow pump, a diaphragm pump, a smooth flow pump, a peristaltic pump, a pipette filler, a pipetting robot, a filling robot or the like can be used, and a commercially available device, such as a 500 series process pump (manufactured by Watson-Marlow), a tube pump for bioprocess (manufactured by Watson-Marlow), a 300 series laboratory tube pump (manufactured by Watson-Marlow), or a peristaltic pump of PF series (manufactured by Flexicon) or PD series (manufactured by Flexicon), can be used.

In one aspect of the present invention, after filling the pharmaceutical solution in a vessel, suction of the pharmaceutical solution (suck-back) is performed by reversing the pump before a next filling operation. Conditions for the suck-back can be appropriately set in accordance with the size of the filling nozzle. The pumping rate in performing the suck-back is, for example, 0.1 to 300 mL/min, specifically 1 to 150 mL/min, and more specifically 10 to 100 mL/min, and a time for performing the suck-back is, for example, 0.01 to 5 seconds, specifically 0.01 to 1 second, and more specifically 0.1 to 0.5 seconds.

In one aspect of the present invention, the filling of the pharmaceutical solution in a vessel is performed by extruding the solution by a gas pressure. Conditions of a filling pressure, a time for opening/closing a valve and the like can be appropriately set in accordance with the size of the filling nozzle, the viscosity of the liquid, the filling amount and the like. The filling pressure here is, for example, 0.01 to 3 atm, specifically 0.1 to 2 atm, more specifically 0.3 to 1 atm, and further specifically 0.3 to 0.6 atm.

Even when the suck-back is performed, the pharmaceutical solution remaining in the passage moves in the downward direction to adhere in the vicinity of the tip of the nozzle in the form of a droplet. In the filling nozzle of the present invention, the droplet thus remaining in the vicinity of the tip of the nozzle is held in a position within the nozzle and away from the lower end of the filling port, and hence the droplet is prevented from drying, and thus, adhesion of a solid component is inhibited. In a preferable embodiment of the present invention, the liquid surface (interface) of the droplet lower end within the nozzle is retained above the lower end of the passage of the nozzle body. A distance from the lower end of the filling port to the liquid surface of the droplet lower end within the nozzle is hereinafter sometimes referred to as a liquid surface height.

EXAMPLES

Now, the present invention will be described in more detail with reference to Reference Examples and Examples, and it is noted that the present invention is not limited to these Examples.

Preparation of Pharmaceutical Solution

In tests performed for checking the effects of the present invention, the following liquid formulations were used as the pharmaceutical solution.

Antibody Formulation A: an aqueous solution containing 240 mg/mL of a monoclonal antibody, an additive, and a surfactant. Viscosity: 50 cP Surface tension: 46.8 mN/m Ionic strength: 2.88 mS/cm Density: 1.081 g/cm$^3$ Antibody Formulation B: an aqueous solution containing 180 mg/mL of a monoclonal antibody, an additive, and a surfactant. Viscosity: 8 cP Surface tension: 45.4 mN/m Ionic strength: 7.58 mS/cm Density: 1.058 g/cm$^3$ Antibody Formulation C: an aqueous solution containing 150 mg/mL of a monoclonal antibody, an additive, and a surfactant. Viscosity: 6 cP Surface tension: 48.0 mN/m Ionic strength: 4.09 mS/cm Density: 1.061 g/cm$^3$ Antibody Formulation D: an aqueous solution containing 120 mg/mL of a monoclonal antibody, an additive, and a surfactant. Viscosity: 4 cP Surface tension: 49.6 mN/m Ionic strength: 4.42 mS/cm Density: 1.051 g/cm$^3$ Antibody Formulation E: an aqueous solution containing 241 mg/mL of a monoclonal antibody, and an additive. Viscosity: 62 cP Surface tension: 63.7 mN/m Ionic strength: 3.36 mS/cm Density: 1.093 g/cm$^3$ Formulation F: an aqueous solution containing an additive, and a surfactant. Viscosity: 1 cP Surface tension: 42.8 mN/m Ionic strength: 5.64 mS/cm Density: 1.019 g/cm$^3$ Preparation of Filling Nozzle Filling nozzles were produced by using, as a material, an acrylic resin (Acryl), polypropylene (PP), a cycloolefin copolymer (COC), and a cycloolefin polymer (COP). The filling nozzle of the acrylic resin was molded from VisiJet(R) M3 by using a 3D printer (HD3500MAX, Xtreme High Definition Mode; manufactured by 3D Systems). The filling nozzle of PP was obtained by processing Combitip Advanced(R) 0.1 mL (manufactured by Eppendorf) into a length of 65 mm. In processing for obtaining a tip shape, the tip portion was drilled to obtain desired sizes in the inner shape of the filling port and in the length of the passage. As a drill, a high-speed steel drill (manufactured by MITSUBISHI MATERIALS CORPORATION) having a diameter of 2.2 mm was used. The sizes obtained by the processing was checked with a ruler.

A resin of COC (TOPAS(R), 6013M-07, manufactured by Polyplastics, Co., Ltd.) was processed by extrusion molding into sizes of a=1.6 mm and b=3.2 mm, and thus, a tube of 65 mm was obtained. In processing for obtaining a tip shape, the tip portion was drilled to obtain desired sizes in the inner shape of the filling port and in the length of the passage. As a drill, a high-speed steel drill (manufactured by Fujiwara Sangyo Co., Ltd.) having a diameter of 2.5 mm was used. The sizes obtained by the processing was checked with a ruler.

The filling nozzle of COP was molded with a mold by using, as the material, a resin of COP (ZEONEX(R) 480R, manufactured by Zeon Corporation). Sizes obtained by the processing was checked with a caliper and a ruler.

In tests of examples below, the following filling nozzles were used.

Figure 7:
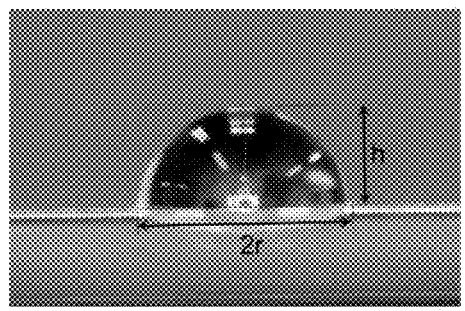
FIG. 7 is an example of an image of measurement of a water contact angle of a material of a filling nozzle by a sessile drop method (θ/2 method). The measurement was performed by utilizing an outer surface of a filling nozzle (coc_1, inner diameter a=1.6 mm, outer diameter=3.2 mm) made of a cycloolefin copolymer (COC).

(Filling nozzles of cycloolefin copolymer)
coc_1: a=1.6 mm, b=3.2 mm, e=65 mm, inner diameter: constant
coc_2: a=1.6 mm, b=3.2 mm, c=2.5 mm, d=4 mm, e=65 mm, f=90 degrees (Filling nozzles of polypropylene)
pp_1: a=1.6 mm, b=3.2 mm, e=65 mm, inner diameter: constant
pp_2: a=1.6 mm, b=3.2 mm, c=2.2 mm, d=3 mm, e=65 mm, f=90 degrees (Filling nozzles of acrylic resin)
ac_1: a=1.5 mm, b=2.5 mm, e=75 mm, inner diameter: constant
ac_2: a=1.5 mm, b=3.1 mm, c=2.1 mm, d=3 mm, e=75 mm, f=135 degrees
ac_3: a=1.0 mm, b=2.0 mm, e=75 mm, inner diameter: constant
ac_4: a=2.0 mm, b=3.0 mm, e=75 mm, inner diameter: constant
ac_5: a=3.0 mm, b=4.0 mm, e=75 mm, inner diameter: constant
ac_6: a=5.0 mm, b=6.0 mm, e=75 mm, inner diameter: constant
ac_7: a=1.0 mm, b=2.6 mm, c=1.6 mm, d=3 mm, e=75 mm, f=135 degrees
ac_8: a=2.0 mm, b=3.6 mm, c=2.6 mm, d=3 mm, e=75 mm, f=135 degrees
ac_9: a=3.0 mm, b=4.6 mm, c=3.6 mm, d=3 mm, e=75 mm, f=135 degrees
ac_10: a=5.0 mm, b=6.6 mm, c=5.6 mm, d=3 mm, e=75 mm, f=135 degrees
ac_11: a=1.5 mm, b=2.7 mm, c=1.7 mm, d=3 mm, e=75 mm, f=135 degrees
ac_12: a=1.5 mm, b=3.5 mm, c=2.5 mm, d=3 mm, e=75 mm, f=135 degrees
ac_13: a=1.5 mm, b=4.5 mm, c=3.5 mm, d=3 mm, e=75 mm, f=135 degrees
ac_14: a=2.0 mm, b=3.2 mm, c=2.2 mm, d=3 mm, e=75 mm, f=135 degrees
ac_15: a=2.0 mm, b=3.6 mm, c=2.6 mm, d=3 mm, e=75 mm, f=135 degrees
ac_16: a=2.0 mm, b=5.0 mm, c=4.0 mm, d=3 mm, e=75 mm, f=135 degrees
ac_17: a=2.0 mm, b=3.6 mm, c=2.6 mm, d=1 mm, e=75 mm, f=135 degrees
ac_18: a=2.0 mm, b=3.6 mm, c=2.6 mm, d=2 mm, e=75 mm, f=135 degrees
ac_19: a=2.0 mm, b=3.6 mm, c=2.6 mm, d=4 mm, e=75 mm, f=135 degrees
ac_20: a=2.0 mm, b=3.6 mm, c=2.6 mm, d=5 mm, e=75 mm, f=135 degrees
ac_21: a=2.0 mm, b=3.6 mm, c=2.6 mm, d=7 mm, e=75 mm, f=135 degrees
ac_22: a=2.0 mm, b=3.6 mm, c=2.6 mm, d=10 mm, e=75 mm, f=135 degrees
ac_23: a=2.0 mm, b=3.6 mm, c=2.6 mm, d=3 mm, e=75 mm, f=45 degrees
ac_24: a=2.0 mm, b=3.6 mm, c=2.6 mm, d=3 mm, e=75 mm, f=90 degrees
ac_25: a=2.0 mm, b=3.6 mm, c=2.6 mm, d=3 mm, e=75 mm, f=150 degrees
ac_26: a=2.0 mm, b=3.6 mm, c=2.6 mm, d=3 mm, e=75 mm, f=170 degrees (Filling nozzle of stainless steel)
sus_1: a=1.8 mm, b=2.0 mm, e=163 mm, inner diameter: constant (Filling nozzle of PEEK)
peek_1: a=1.6 mm, b=2.0 mm, e=120 mm, inner diameter: constant (Filling nozzle of cycloolefin polymer)
cop_1: a=1.5 mm, b=3.2 mm, c=2.5 mm, d=3.5 mm, e=120 mm, f=90 degrees The water contact angle of each material of these filling nozzles produced was measured by the sessile drop method (θ/2 method). With 1 μL of ultrapure water dropped on an outer solid surface of each filling nozzle, a contact angle θ, that is, an angle of a droplet thus formed, was measured based on the size of the droplet. A photograph of the droplet obtained 0.2 minutes after dropping was taken. For analysis, a diameter $2r$ of the droplet on the solid surface of the material and a height h of the droplet were measured based on the size of the image thus obtained of the droplet, and the water contact angle θ was analyzed in accordance with θ=2 arctan (h/r). In each filling nozzle used in this measurement, the solid surface on the outside and a solid surface on the inside (in the tubular passage or in the vicinity of the filling port) are in the same state. FIG. 7 illustrates an example of the measurement of the water contact angle by using the outer surface of the filling nozzle of COC (coc_1: a=1.5 mm, b=3.2 mm, e=65 mm, inner diameter: constant). As for the water contact angle, an average and a standard deviation of values measured in 3 positions are shown in Table 1.

TABLE 1

| | Shape of Filling nozzle | | Water Contact Angle θ [degrees] | | | |
|---|---|---|---|---|---|---|
| | Inner | Outer | | | | |
| Material | Diameter [mm] | Diameter [mm] | Average | Maximum | Minimum | Standard Deviation |
| Stainless Steel | 1.8 | 2.0 | 63.4 | 68.8 | 59.6 | 4.8 |
| PEEK | 1.6 | 2.0 | 70.2 | 73.2 | 66.3 | 3.5 |
| Acryl | 2.0 | 3.6 | 60.2 | 62.4 | 58.9 | 1.9 |
| COC | 1.6 | 3.2 | 84.1 | 87.1 | 80.1 | 3.6 |
| PP | 1.6 | 3.2 | 91.8 | 93.2 | 90.7 | 1.3 |
| COP | 1.5 | 3.2 | 81.0 | 82.4 | 80.2 | 1.2 |

Figure 8:
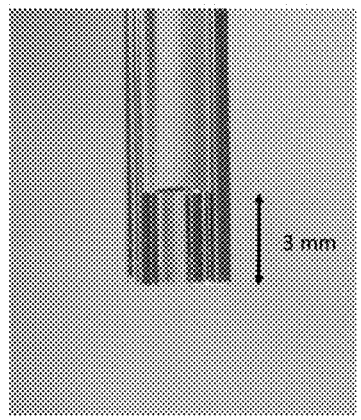
FIG. 8 is a photograph of a state in which a liquid surface height corresponding to a lower end of a solution stagnating in a filling nozzle is in a position away from a tip of the nozzle by 3 mm. The filling nozzle (coc_1, inner diameter a=1.6 mm, outer diameter=3.2 mm) made of a cycloolefin copolymer (COC) was used.
Figure 9:
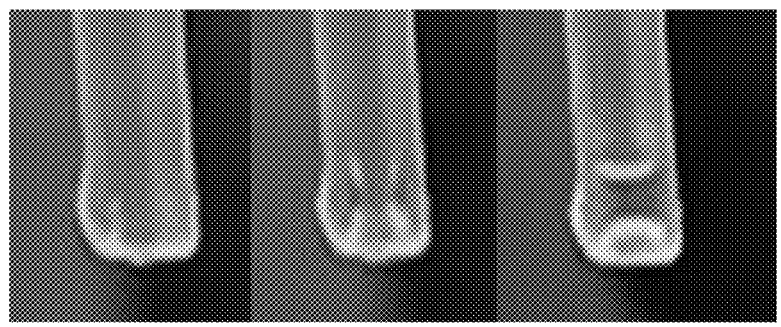
FIG. 9 is an enlarged photograph of a portion in the vicinity of a lower end of a nozzle body of a filling nozzle (pp_1, inner diameter a=1.6 mm, outer diameter=3.2 mm) made of polypropylene obtained immediately after performing suck-back after filling a pharmaceutical solution by using the filling nozzle and a peristaltic filling pump at a filling rate of 200 rpm. States (from (a) to (b), and then to (c)) obtained immediately after completing the suck-back after normally performing filling are exemplarily illustrated. Even when the suck-back is performed, the pharmaceutical solution remaining in a passage moves in a downstream direction, and adheres in the vicinity of the tip of the nozzle in the form of a droplet. As a liquid surface height, a liquid surface position obtained in the state (c) after completing the suck-back is measured.

Tools used in Filling
  Filling pump A: peristaltic pump with suck-back function, manufactured by Watson-Marlow
  Filling pump B: peristaltic pump with suck-back function, manufactured by Flexicon
  Filling tube: pump driving unit: silicon tube having an inner diameter of 1.6 mm and an outer diameter of 6.4 mm, FEP tube having an inner diameter of 1.6 mm and an outer diameter of 3.2 mm, and tube of about 3 m consisting of a connector Measurement Method for Liquid Surface Height
A distance between the lower end of the filling nozzle (the filling port) and the lower end liquid surface (gas-liquid interface) of a solution stagnating within the filling nozzle was measured with a ruler, and defined as the liquid surface height. When the liquid surface was present within the filling nozzle, the liquid surface height had a positive value, and when the solution was exposed from the lower end of the filling nozzle, the liquid surface height had a negative value (FIG. 8). The liquid surface height was measured after the position of the lower end liquid surface (gas-liquid interface)

of the solution stagnating in the filling nozzle was settled after the filling, and if there were a plurality of liquid surfaces of the stagnating solution (droplets), a distance from the liquid surface closest to the lower end of the filling nozzle was measured (FIG. 9(c)).

Clogging of Filling Nozzle

Figure 10:
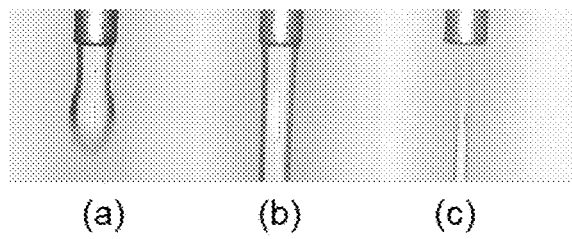
FIG. 10 is an example of an enlarged photograph of a portion in the vicinity of a lower end of a filling nozzle made of stainless steel in filling a pharmaceutical solution by using the filling nozzle. States obtained in normal filling from discharge of the pharmaceutical solution to completion of the filling are illustrated in the order of (a), (b) and (c).
Figure 11:
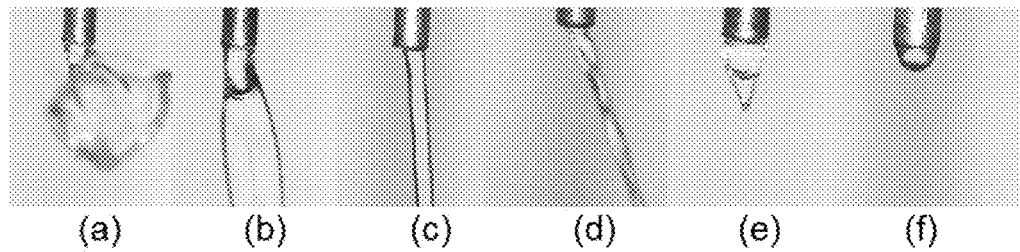
FIG. 11 is an enlarged photograph of a portion in the vicinity of a filling port of a filling nozzle made of stainless steel in filling a pharmaceutical solution by using the filling nozzle, and illustrates examples of clogging of the filling nozzle occurring in production of a liquid pharmaceutical formulation. When the clogging of the filling nozzle occurs, it is found, for example, that the pharmaceutical solution is scattered ((a) or (b)) in filling, filling accuracy of the pharmaceutical solution is deteriorated, the pharmaceutical solution is discharged diagonally ((c) or (d)), the pharmaceutical solution is solidified (e), or the pharmaceutical solution is stopped to discharge due to clogging of a nozzle passage by a dried portion of the pharmaceutical solution (f).

In filling a pharmaceutical solution, the lower end of the filling nozzle (filling port) was visually observed to determine whether or not the filling nozzle was clogged. In normal filling, the pharmaceutical solution is discharged straight in the length direction of the filling nozzle (FIG. 10). Examples of the clogging include scatter of the pharmaceutical solution in filling the pharmaceutical solution, deterioration of the filling rate of the pharmaceutical solution, lowering of filling accuracy, change of a discharging direction of the pharmaceutical solution, formation, attachment, accumulation or drop of a solid formed by drying of the pharmaceutical solution, and blockage by the solid in a discharging port of the nozzle. The blockage in the discharging port of the nozzle leads to a state where the pharmaceutical solution cannot be discharged, and when such a state different from that of the normal filling was observed, it was determined that the filling nozzle was clogged (FIG. 11).

Test Example 1

A test was performed in a clean booth under ventilation condition using an HEPA filter at a wind velocity of 0.5 m/s. After each of the antibody formulation A, the antibody formulation B, the antibody formulation C, and the antibody formulation D (about 1.2 mL each) was filled in a vessel by using the filling pump A, the resultant filling nozzle having a prescribed liquid surface height was allowed to stand still for 2 hours, and then it was checked whether or not the filling nozzle was clogged (N=3). In the filling, the suck-back was performed. The liquid surface height was measured after the suck-back and before standing, and after 2 hours, the filling was performed again to determine, by visual observation, whether or not the filling nozzle was clogged. As the filling nozzle, the filling nozzle of a polypropylene material (pp_1: a=1.6 mm, b=3.2 mm, e=65 mm, having no filling port) having a constant inner diameter from the upper end to the lower end was used.

Figure 12:
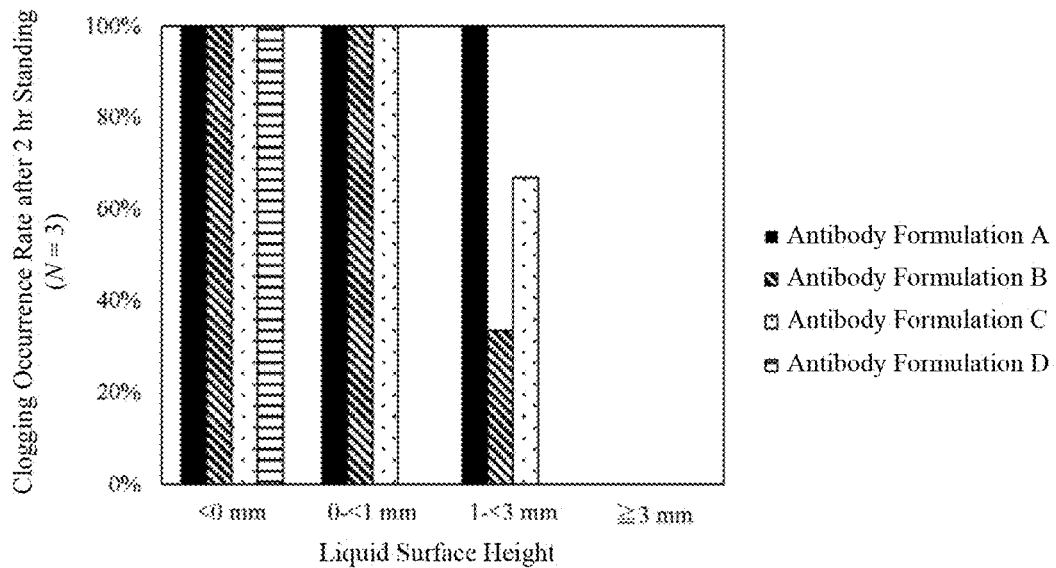
FIG. 12 is a graph illustrating occurrence of clogging of a filling nozzle (N=3 for each solution) obtained after filling a pharmaceutical solution (about 1.2 mL) containing an antibody in a vessel by using a peristaltic pump and allowing the resultant to stand still for 2 hours. A filling nozzle (pp_1) made of a polypropylene material was used as the filling nozzle. As the pharmaceutical solution, an antibody formulation A, an antibody formulation B, an antibody formulation C, or an antibody formulation D was used.

Results are illustrated in FIG. 12. In using a pharmaceutical solution containing 120 mg/mL or more of an antibody, when the liquid surface height was 1 mm or more and less than 3 mm, 0 mm or more and less than 1 mm, or less than 0 mm, the pharmaceutical solution stagnating in the vicinity of the filling port dried to cause clogging in the filling nozzle. On the other hand, when the liquid surface height is 3 mm or more, the clogging of the filling nozzle did not occur. It was thus confirmed that the clogging of a filling nozzle can be prevented by setting the liquid surface height to 3 mm or more.

Test Example 2

Regarding the relationship between a material of a filling nozzle and a stagnation position of a solution within the nozzle, the following test was performed.

Regarding a stagnation position of a solution within a filling nozzle made of a cycloolefin copolymer, the following test was performed. The filling pump B was used to fill the antibody formulation A (about 1.2 mL (1.111 mL to 1.260 mL)) in a vessel to measure a distance between the lower end liquid surface of the pharmaceutical solution stagnating in the filling nozzle and the nozzle lower end, and ratio of liquid surface height (N=100) having liquid surface heights of 3 mm or more, 1 mm or more and less than 3 mm, 0 mm or more and less than 1 mm, and less than 0 mm were respectively checked. The pumping rate in the filling was set to 200 rpm, and the suck-back was performed in the filling. As the filling nozzle, the filling nozzle (ac_1) made of an acrylic material and having a constant inner diameter (a=1.5 mm) from the upper end to the lower end, the filling nozzle (pp_1) made of a polypropylene material and having a constant inner diameter (a=1.6 mm) from the upper end to the lower end, or the filling nozzle (coc_1) made of a cycloolefin copolymer material and having a constant inner diameter (a=1.6 mm) from the upper end to the lower end was used.

Figure 13:
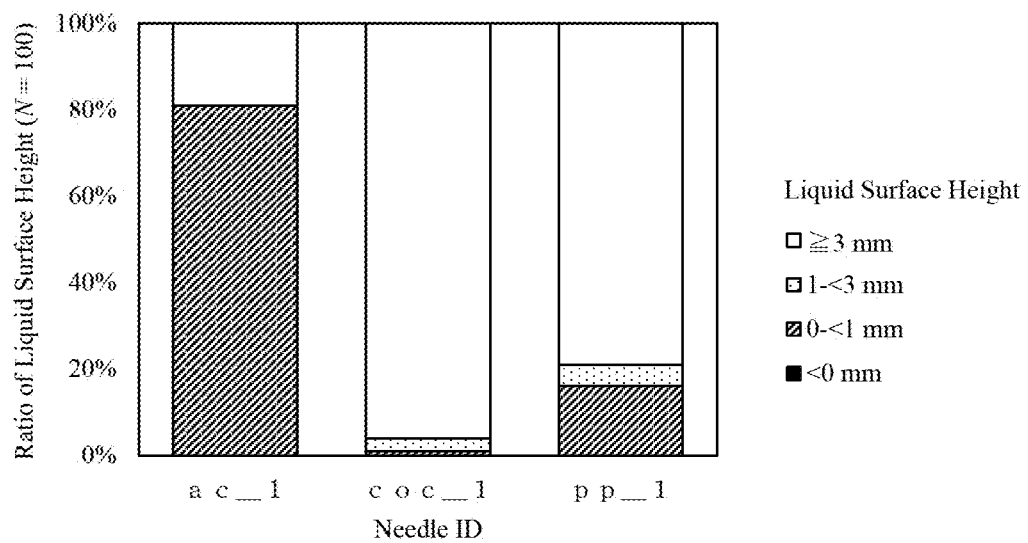
FIG. 13 is a graph illustrating the position of a lower end liquid surface of a pharmaceutical solution stagnating in a filling nozzle obtained after filling a pharmaceutical solution (about 1.2 mL) containing an antibody in a vessel by using a peristaltic pump. Ratio of liquid surface height (N=100) respectively having, between the lower end liquid surface of the pharmaceutical solution stagnating in the filling nozzle and a nozzle lower end, distances of 3 mm or more, 1 mm or more and less than 3 mm, 0 mm or more and less than 1 mm, and less than 0 mm are illustrated. As the filling nozzle, a filling nozzle (ac_1) made of an acrylic material, a filling nozzle (pp_1) made of a polypropylene material, or a filling nozzle (coc_1) made of a cycloolefin copolymer material was used. As the pharmaceutical solution, the antibody formulation A was used.

Results are illustrated in FIG. 13. When the cycloolefin copolymer was used as the material of the filling nozzle, the ratio of the nozzles having a liquid surface height of the pharmaceutical solution stagnating in the filling nozzle of 3 mm or more was high.

Test Example 3

Figure 14:
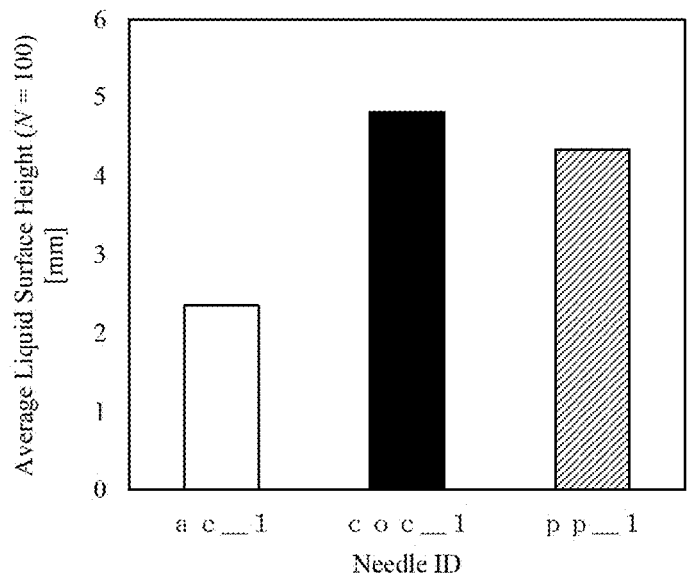
FIG. 14 is a graph illustrating an average (N=100) of a distance (mm) between a lower end liquid surface of a pharmaceutical solution stagnating in a filling nozzle and a nozzle lower end obtained after filling the pharmaceutical solution (about 1.2 mL) containing an antibody in a vessel by using a peristaltic pump. As the filling nozzle, the filling nozzle (ac_1) made of an acrylic material, the filling nozzle (pp_1) made of a polypropylene material, or the filling nozzle (coc_1) made of a cycloolefin copolymer material was used. As the pharmaceutical solution, the antibody formulation A was used.

An average (N=100) of the liquid surface heights (mm) corresponding to the distance between the lower end liquid surface of the pharmaceutical solution stagnating in the filling nozzle and the nozzle lower end obtained in Test Example 2 described above is illustrated in a graph of FIG. 14. It was confirmed that the liquid surface height of the pharmaceutical solution stagnating in the filling nozzle can be retained at a high position when the material of the filling nozzle was a cycloolefin copolymer.

Test Example 4

Regarding the relationship between the shape of a filling nozzle and the stagnation position of a solution within the nozzle, the following test was performed.

The filling pump B was used to fill a pharmaceutical solution (about 1.2 mL (1.106 mL to 1.260 mL)) in a vessel to measure a distance between the lower end liquid surface of the pharmaceutical solution stagnating in the filling nozzle and the nozzle lower end, and ratio of liquid surface height (N=100) having liquid surface heights of 3 mm or more, 1 mm or more and less than 3 mm, 0 mm or more and less than 1 mm, and less than 0 mm were respectively checked. A pumping rate in the filling was set to 200 rpm, and the suck-back was performed in the filling. As the filling nozzle, the filling nozzle ac_1 (the filling nozzle made of an acrylic material, and having a constant inner diameter (a=1.5 mm) from the upper end to the lower end), the filling nozzle pp_1 (the filling nozzle made of a polypropylene material, and having a constant inner diameter (a=1.6 mm) from the upper end to the lower end), the filling nozzle coc_1 (the filling nozzle made of a resin of a cycloolefin copolymer), the filling nozzle ac_2 (the filling nozzle made of an acrylic material, and having the inner diameter c of the passage of the filling port of 2.1 mm and the passage length d of 3 mm), the filling nozzle coc_2 (the filling nozzle made of a cycloolefin copolymer material, and having the inner diameter c of the passage of the filling port of 2.5 mm and the passage length d of 4 mm), or the filling nozzle pp_2 (the filling nozzle made of a polypropylene material, and having the inner diameter c of the passage of the filling port of 2.2 mm and the passage length d of 3 mm) was used.

Figure 15:
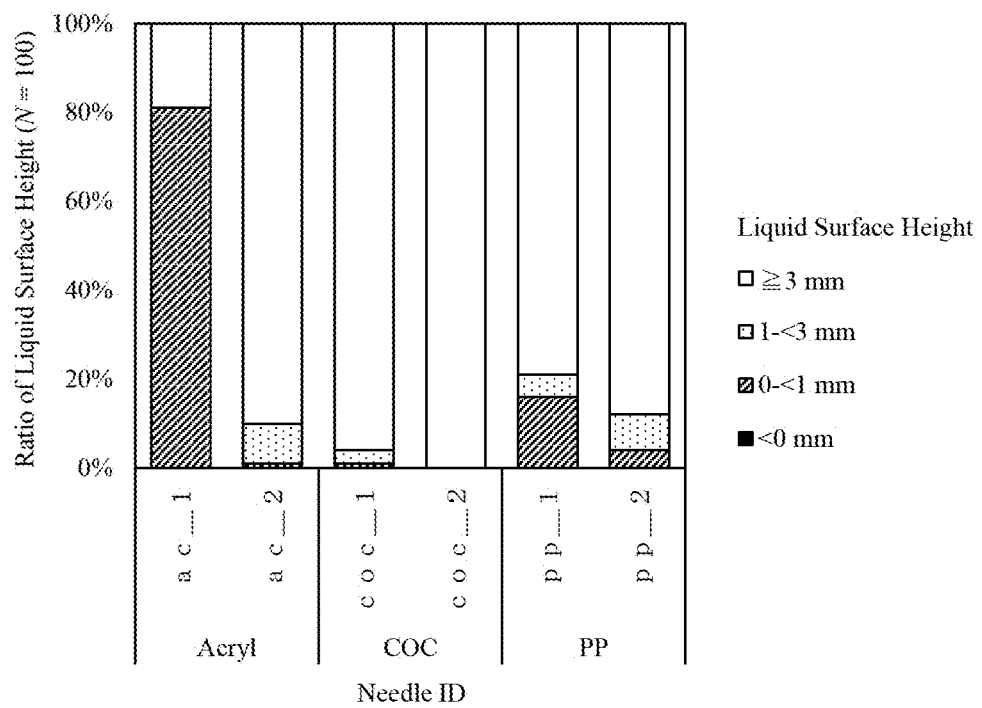
FIG. 15 is a graph illustrating ratio of liquid surface height (N=100) having, between a lower end liquid surface of a pharmaceutical solution stagnating in the filling nozzle and a nozzle lower end, distances of 3 mm or more, 1 mm or more and less than 3 mm, 0 mm or more and less than 1 mm, and less than 0 mm obtained after filling the pharmaceutical solution (about 1.2 mL) containing an antibody in a vessel by using a peristaltic pump. As the filling nozzle, the filling nozzle (ac_1) made of an acrylic material, the filling nozzle (pp_1) made of a polypropylene material, the filling nozzle (coc_1) made of a cycloolefin copolymer material, a filling nozzle (ac_2) made of an acrylic material, a filling nozzle (coc_2) made of a cycloolefin copolymer material, or a filling nozzle (pp_2) made of a polypropylene material was used. As the pharmaceutical solution, the antibody formulation A was used.

Results are illustrated in FIG. 15. It was confirmed that a ratio of filling nozzles in which the liquid surface height of a pharmaceutical solution stagnating in the filling nozzle can be 3 mm or more can be increased by expanding the inner diameter c of the passage of the filling port of the filling nozzle. Besides, it was confirmed that a ratio of nozzles in which the liquid surface height of a pharmaceutical solution stagnating in the filling nozzle can be 3 mm or more can be increased by expanding the inner diameter c of the passage of the filling port of the filling nozzle in using the filling nozzles of all the materials, specifically, in using a material having a water contact angle of 58 degrees or more.

Test Example 5

Figure 16:
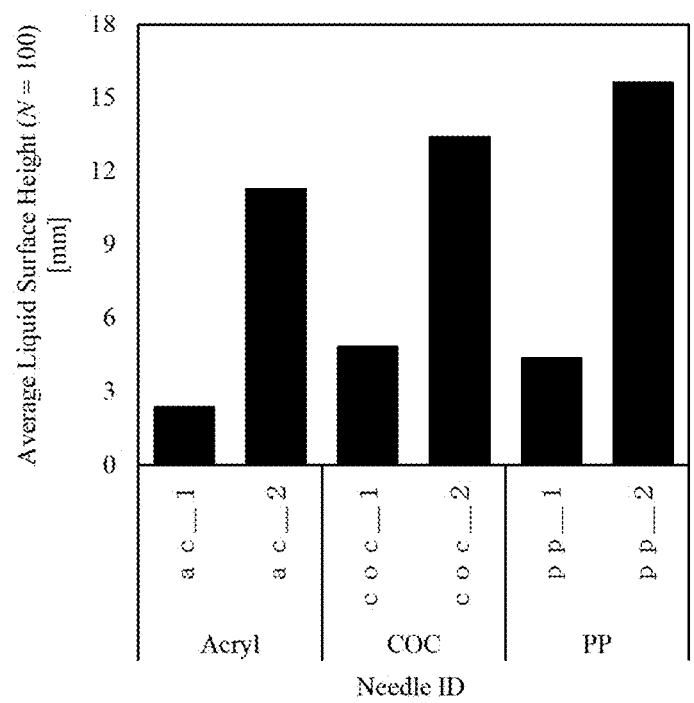
FIG. 16 is a graph illustrating an average (N=100) of a distance (mm) between a lower end liquid surface of a pharmaceutical solution stagnating in a filling nozzle and a nozzle lower end obtained after filling the pharmaceutical solution (about 1.2 mL) containing an antibody in a vessel by using a peristaltic pump. As the filling nozzle, the filling nozzle (ac_1) made of an acrylic material, the filling nozzle (pp_1) made of a polypropylene material, the filling nozzle (coc_1) made of a cycloolefin copolymer material, the filling nozzle (ac_2) made of an acrylic material, the filling nozzle (coc_2) made of a cycloolefin copolymer material, or the filling nozzle (pp_2) made of a polypropylene material was used. As the pharmaceutical solution, the antibody formulation A was used.

An average (N=100) of the liquid surface heights (mm) corresponding to the distance between the lower end liquid surface of the pharmaceutical solution stagnating in the filling nozzle and the nozzle lower end, obtained in Test Example 4 described above, is illustrated in a graph of FIG. 16. It was confirmed that the liquid surface height of the pharmaceutical solution stagnating in the filling nozzle can be retained at a higher position by expanding the inner diameter c of the passage of the filling port of the filling nozzle. It was also confirmed that the liquid surface height of the pharmaceutical solution stagnating in the filling nozzle can be retained at a higher position by expanding the inner diameter c of the passage of the filling port of the filling nozzle in using the filling nozzles of all the materials, specifically, in using a material having a water contact angle of 58 degrees or more.

Test Example 6

Each of the filling nozzles pp_1 and coc_2 was used to fill each of the antibody formulation A, the antibody formulation B, the antibody formulation C, and the antibody formulation D (about 1.2 mL (1.160 to 1.223 mL) each) in a vessel by using the filling pump B, and a distance (mm) between the lower end liquid surface of the pharmaceutical solution stagnating in the filling nozzle and the nozzle lower end was measured. A pumping rate in the filling was set to 200 rpm, and the suck-back was performed in the filling.

Figure 17:
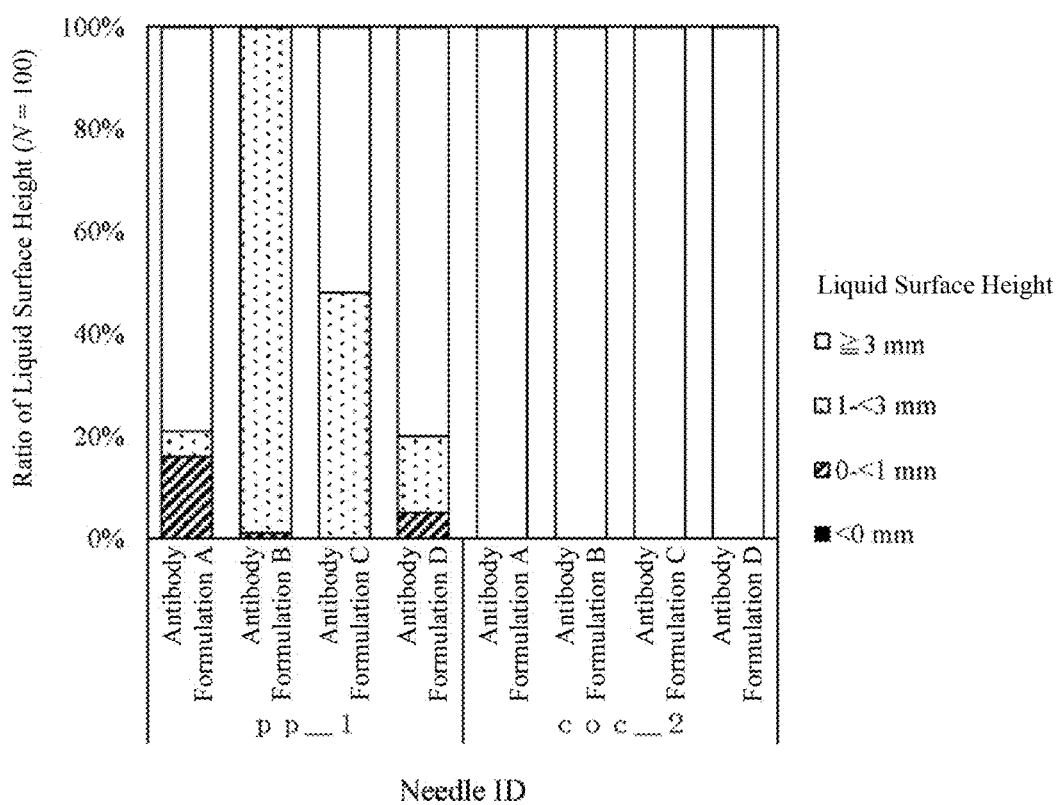
FIG. 17 is a graph illustrating ratio of liquid surface height (N=100) respectively having, between a lower end liquid surface of a pharmaceutical solution stagnating in the filling nozzle and a nozzle lower end, distances of 3 mm or more, 1 mm or more and less than 3 mm, 0 mm or more and less than 1 mm, and less than 0 mm obtained after filling the pharmaceutical solution (about 1.2 mL) containing an antibody in a vessel by using a peristaltic pump. As the filling nozzle, the filling nozzle (pp_1) made of a polypropylene material, or the filling nozzle (coc_2) made of a cycloolefin copolymer material was used. As the pharmaceutical solution, the antibody formulation A, the antibody formulation B, the antibody formulation C, or the antibody formulation D was used.

Results are illustrated in FIG. 17. Ratio of liquid surface height (N=100) having a distance between the lower end liquid surface of the pharmaceutical solution stagnating in the filling nozzle and the nozzle lower end of 3 mm or more, 1 mm or more and less than 3 mm, 0 mm or more and less than 1 mm, and less than 0 mm were respectively checked. It was confirmed that a ratio of nozzles in which the liquid surface height of a pharmaceutical solution stagnating in the filling nozzle can be 3 mm or more can be increased by expanding the inner diameter c of the tip shape of the filling nozzle in using all the antibody formulations.

Test Example 7

Figure 18:
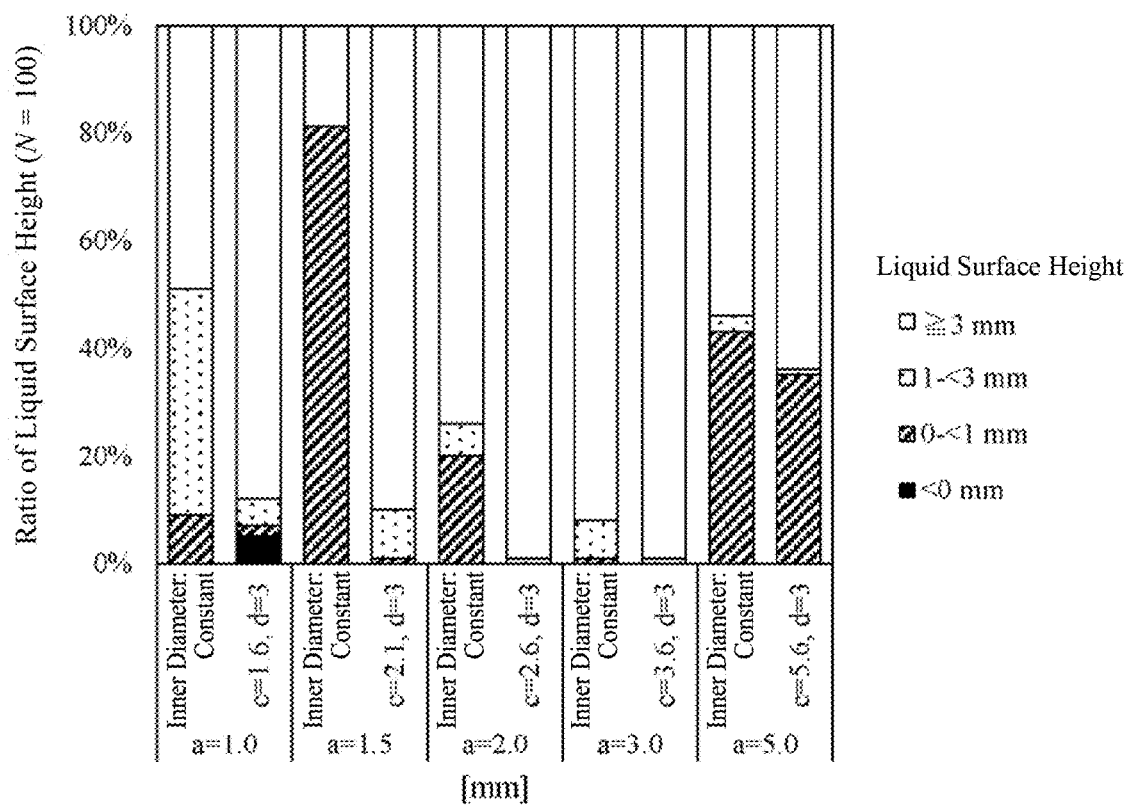
FIG. 18 is a graph illustrating ratio of liquid surface height (N=100) respectively having, between a lower end liquid surface of a pharmaceutical solution stagnating in the filling nozzle and a nozzle lower end, distances of 3 mm or more, 1 mm or more and less than 3 mm, 0 mm or more and less than 1 mm, and less than 0 mm obtained after filling the pharmaceutical solution (about 1.2 mL) containing an antibody in a vessel by using a peristaltic pump. As the filling nozzle, any one of filling nozzles (ac_3, ac_1, ac_4, ac_5, and ac_6) made of acrylic materials, and filling nozzles (ac_7, ac_2, ac_8, ac_9, and ac_10) made of acrylic materials was used. As the pharmaceutical solution, the antibody formulation A was used.

The filling pump B was used to fill the antibody formulation A (about 1.2 mL (1.084 to 1.293 mL)) to measure the liquid surface height (mm) corresponding to the distance between the lower end liquid surface of the pharmaceutical solution stagnating in the filling nozzle and the nozzle lower end (N=100). The pumping rate in the filling was set to 200 rpm, and the suck-back was performed in the filling. Filling nozzles used were made of an acrylic resin, and respectively had the following shapes:

Control filling nozzles:
ac_3: a=1.0 mm, b=2.0 mm, e=75 mm, inner diameter: constant
ac_1: a=1.5 mm, b=2.5 mm, e=75 mm, inner diameter: constant
ac_4: a=2.0 mm, b=3.0 mm, e=75 mm, inner diameter: constant
ac_5: a=3.0 mm, b=4.0 mm, e=75 mm, inner diameter: constant
ac_6: a=5.0 mm, b=6.0 mm, e=75 mm, inner diameter: constant Filling nozzles having diameter c larger than diameter a:
ac_7: a=1.0 mm, b=2.6 mm, c=1.6 mm, d=3 mm, e=75 mm, f=135 degrees
ac_2: a=1.5 mm, b=3.1 mm, c=2.1 mm, d=3 mm, e=75 mm, f=135 degrees
ac_8: a=2.0 mm, b=3.6 mm, c=2.6 mm, d=3 mm, e=75 mm, f=135 degrees
ac_9: a=3.0 mm, b=4.6 mm, c=3.6 mm, d=3 mm, e=75 mm, f=135 degrees
ac_10: a=5.0 mm, b=6.6 mm, c=5.6 mm, d=3 mm, e=75 mm, f=135 degrees FIG. 18 is a graph illustrating ratio of liquid surface height (N=100) respectively having, between the lower end liquid surface of the pharmaceutical solution stagnating in the filling nozzle and the nozzle lower end, distances of 3 mm or more, 1 mm or more and less than 3 mm, 0 mm or more and less than 1 mm, and less than 0 mm. In comparison among filling nozzles having the same inner diameter, it was confirmed that a ratio of nozzles in which the liquid surface height of a pharmaceutical solution stagnating in the filling nozzle can be 3 mm or more can be increased by expanding the inner diameter c of the tip shape of the filling nozzle.

Test Example 8

Figure 19:
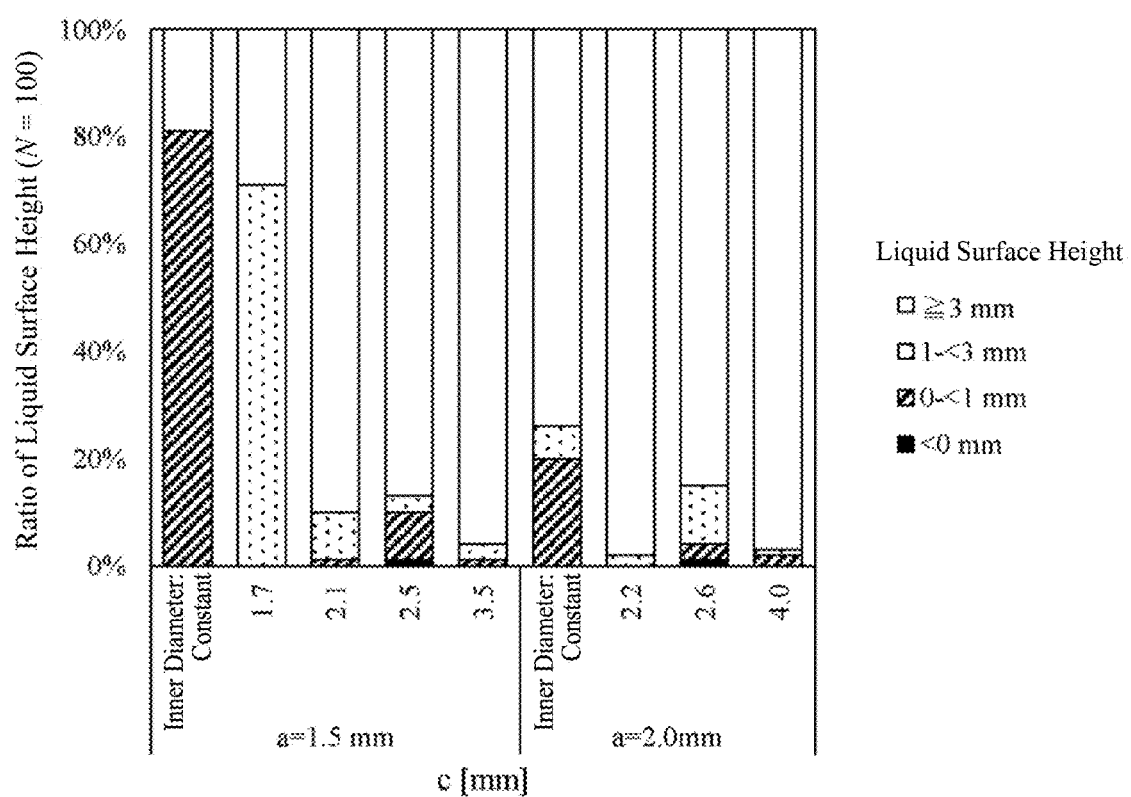
FIG. 19 is a graph illustrating ratio of liquid surface height (N=100) respectively having, between a lower end liquid surface of a pharmaceutical solution stagnating in the filling nozzle and a nozzle lower end, distances of 3 mm or more, 1 mm or more and less than 3 mm, 0 mm or more and less than 1 mm, and less than 0 mm obtained after filling the pharmaceutical solution (about 1.2 mL) containing an antibody in a vessel by using a peristaltic pump. As the filling nozzle, any one of the filling nozzles (ac_1 and ac_4) made of the acrylic materials, and filling nozzles (ac_11, ac_2, ac_12, ac_13, ac_14, ac_15, and ac_16) made of acrylic materials was used. As the pharmaceutical solution, the antibody formulation A was used.

The same test as that of Test Example 7 was performed by using filling nozzles made of an acrylic resin and respectively having the following shapes: Control filling nozzles:
ac_1: a=1.5 mm, b=2.5 mm, e=75 mm, inner diameter: constant
ac_4: a=2.0 mm, b=3.0 mm, e=75 mm, inner diameter: constant Filling nozzles having diameter c larger than diameter a:
ac_11: a=1.5 mm, b=2.7 mm, c=1.7 mm, d=3 mm, e=75 mm, f=135 degrees
ac_2: a=1.5 mm, b=3.1 mm, c=2.1 mm, d=3 mm, e=75 mm, f=135 degrees
ac_12: a=1.5 mm, b=3.5 mm, c=2.5 mm, d=3 mm, e=75 mm, f=135 degrees
ac_13: a=1.5 mm, b=4.5 mm, c=3.5 mm, d=3 mm, e=75 mm, f=135 degrees
ac_14: a=2.0 mm, b=3.2 mm, c=2.2 mm, d=3 mm, e=75 mm, f=135 degrees
ac_15: a=2.0 mm, b=3.6 mm, c=2.6 mm, d=3 mm, e=75 mm, f=135 degrees
ac_16: a=2.0 mm, b=5.0 mm, c=4.0 mm, d=3 mm, e=75 mm, f=135 degrees FIG. 19 is a graph illustrating ratio of liquid surface height (N=100) respectively having, between the lower end liquid surface of the pharmaceutical solution stagnating in the filling nozzle and the nozzle lower end, distances of 3 mm or more, 1 mm or more and less than 3 mm, 0 mm or more and less than 1 mm, and less than 0 mm. It was confirmed that the pharmaceutical solution stagnating in the filling nozzle can be retained at a high position by expanding the inner diameter c of the filling port of the filling nozzle by 0.2 to 2 mm Besides, also when an inclined portion was provided between the tubular passage of the nozzle body and the passage of the filling port, it was confirmed that the pharmaceutical solution stagnating in the filling nozzle can be retained at a high position by expanding the inner diameter c of the tip shape of the filling nozzle. When the ratio d/c of the length of the filling port in the length direction of the filling nozzle to the inner diameter at the end of the filling port was 0.7 to 1.8, the effect of the present invention that the pharmaceutical solution stagnating in the filling nozzle can be retained at a high position was found to be exhibited.

Test Example 9

Figure 20:
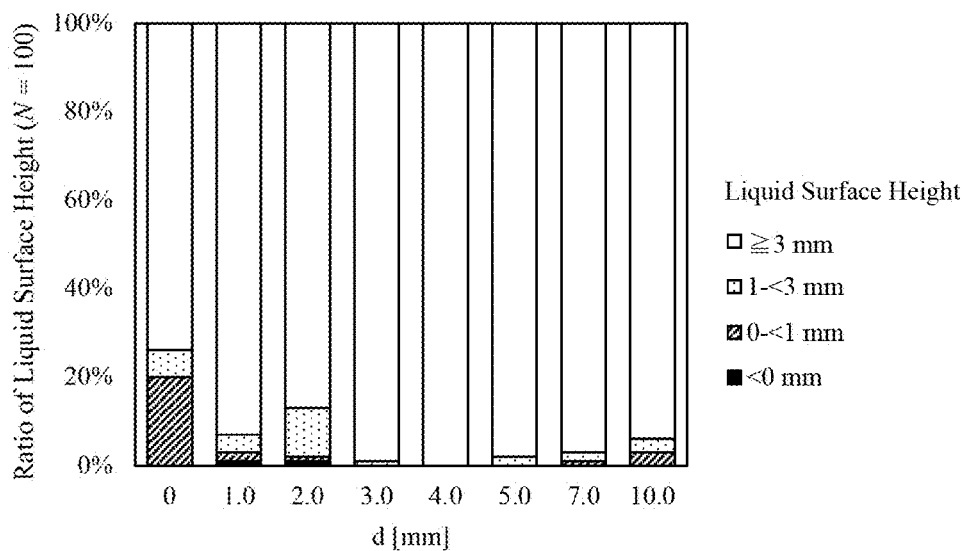
FIG. 20 is a graph illustrating ratio of liquid surface height (N=100) respectively having, between a lower end liquid surface of a pharmaceutical solution stagnating in the filling nozzle and a nozzle lower end, distances of 3 mm or more, 1 mm or more and less than 3 mm, 0 mm or more and less than 1 mm, and less than 0 mm obtained after filling the pharmaceutical solution (about 1.2 mL) containing an antibody in a vessel by using a peristaltic pump. As the filling nozzle, any one of the filling nozzle (ac_4) made of the acrylic material, and filling nozzles (ac_17, ac_18, ac_8, ac_19, ac_20, ac_21, and ac_22) made of acrylic materials was used. As the pharmaceutical solution, the antibody formulation A was used.

The same test as that of Test Example 7 was performed by using filling nozzles made of an acrylic resin and respectively having the following shapes:
Control filling nozzle:
 ac_4: a=2.0 mm, b=3.0 mm, e=75 mm, inner diameter: constant
Filling nozzles having diameter c larger than diameter a:
 ac_17: a=2.0 mm, b=3.6 mm, c=2.6 mm, d=1 mm, e=75 mm, f=135 degrees
 ac_18: a=2.0 mm, b=3.6 mm, c=2.6 mm, d=2 mm, e=75 mm, f=135 degrees
 ac_8: a=2.0 mm, b=3.6 mm, c=2.6 mm, d=3 mm, e=75 mm, f=135 degrees
 ac_19: a=2.0 mm, b=3.6 mm, c=2.6 mm, d=4 mm, e=75 mm, f=135 degrees
 ac_20: a=2.0 mm, b=3.6 mm, c=2.6 mm, d=5 mm, e=75 mm, f=135 degrees
 ac_21: a=2.0 mm, b=3.6 mm, c=2.6 mm, d=7 mm, e=75 mm, f=135 degrees
 ac_22: a=2.0 mm, b=3.6 mm, c=2.6 mm, d=10 mm, e=75 mm, f=135 degrees FIG. 20 is a graph illustrating ratio of liquid surface height (N=100) respectively having, between the lower end liquid surface of the pharmaceutical solution stagnating in the filling nozzle and the nozzle lower end, distances of 3 mm or more, 1 mm or more and less than 3 mm, 0 mm or more and less than 1 mm, and less than 0 mm. When the length of the passage of the filling port was 1 to 10 mm, preferably 2 to 7 mm, more preferably 3 to 7 mm, and further preferably 3 to 5 mm, the effect of the present invention that the pharmaceutical solution stagnating in the filling nozzle can be retained at a high position was found to be exhibited. When the ratio d/c of the length of the filling port in the length direction of the filling nozzle to the inner diameter at the end of the filling port was 0.4 to 3.9, preferably 0.7 to 2.7, more preferably 1.1 to 2.7, and further preferably 1.1 to 2.0, the effect of the present invention that the pharmaceutical solution stagnating in the filling nozzle can be retained at a high position was found to be exhibited.

Test Example 10

Figure 21:
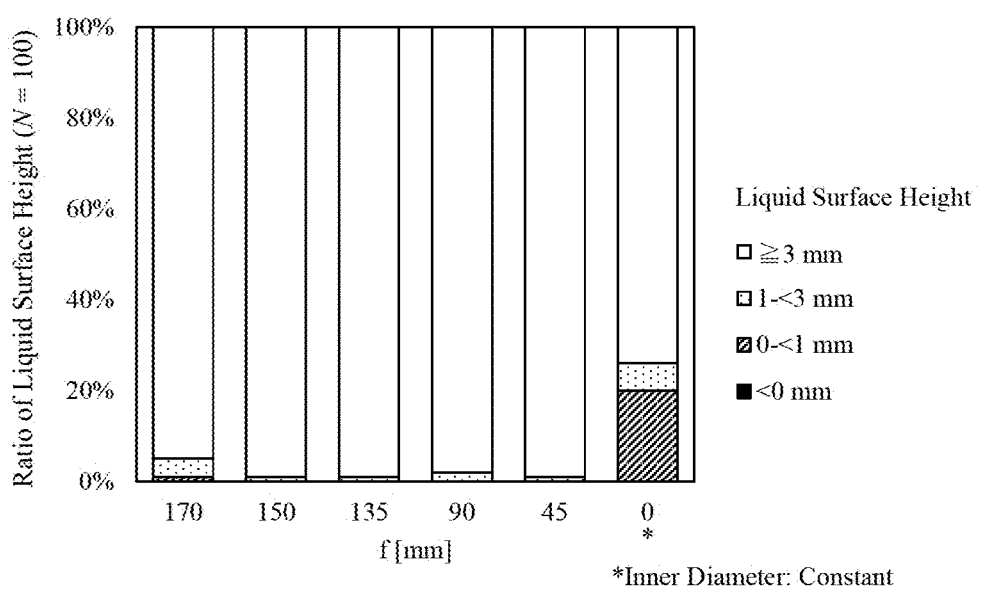
FIG. 21 is a graph illustrating ratio of liquid surface height (N=100) respectively having, between a lower end liquid surface of a pharmaceutical solution stagnating in the filling nozzle and a nozzle lower end, distances of 3 mm or more, 1 mm or more and less than 3 mm, 0 mm or more and less than 1 mm, and less than 0 mm obtained after filling the pharmaceutical solution (about 1.2 mL) containing an antibody in a vessel by using a peristaltic pump. As the filling nozzle, any one of the filling nozzle (ac_4) made of the acrylic material and having a constant inner diameter (a=2.0 mm) from the upper end to the lower end, and filling nozzles (ac_23, ac_24 ac_8, ac_25, and ac_26) made of acrylic materials was used. As the pharmaceutical solution, the antibody formulation A was used.

The same test as that of Test Example 7 was performed by using filling nozzles made of an acrylic resin and respectively having the following shapes:
Control filling nozzle:
 ac_4: a=2.0 mm, b=3.0 mm, e=75 mm, inner diameter: constant
Filling nozzles having diameter c larger than diameter a:
 ac_23: a=2.0 mm, b=3.6 mm, c=2.6 mm, d=3 mm, e=75 mm, f=45 degrees
 ac_24: a=2.0 mm, b=3.6 mm, c=2.6 mm, d=3 mm, e=75 mm, f=90 degrees
 ac_8: a=2.0 mm, b=3.6 mm, c=2.6 mm, d=3 mm, e=75 mm, f=135 degrees
 ac_25: a=2.0 mm, b=3.6 mm, c=2.6 mm, d=3 mm, e=75 mm, f=150 degrees
 ac_26: a=2.0 mm, b=3.6 mm, c=2.6 mm, d=3 mm, e=75 mm, f=170 degrees FIG. 21 is a graph illustrating ratio of liquid surface height (N=100) respectively having, between the lower end liquid surface of the pharmaceutical solution stagnating in the filling nozzle and the nozzle lower end, distances of 3 mm or more, 1 mm or more and less than 3 mm, 0 mm or more and less than 1 mm, and less than 0 mm. The angle (f) between the inner surface of the inclined portion and the inner surface of the passage of the filling port may be about 90 degrees, may be 90 degrees or more, or may be less than 90 degrees, and when the angle f is 45 to 170 degrees, more specifically 90 to 135 degrees, the effect of the present invention that the pharmaceutical solution stagnating in the filling nozzle can be retained at a high position was found to be exhibited.

Test Example 11

Regarding the relationship between a filling nozzle and clogging of the filling nozzle caused by drying of a pharmaceutical solution, the following test was performed.

Figure 22:
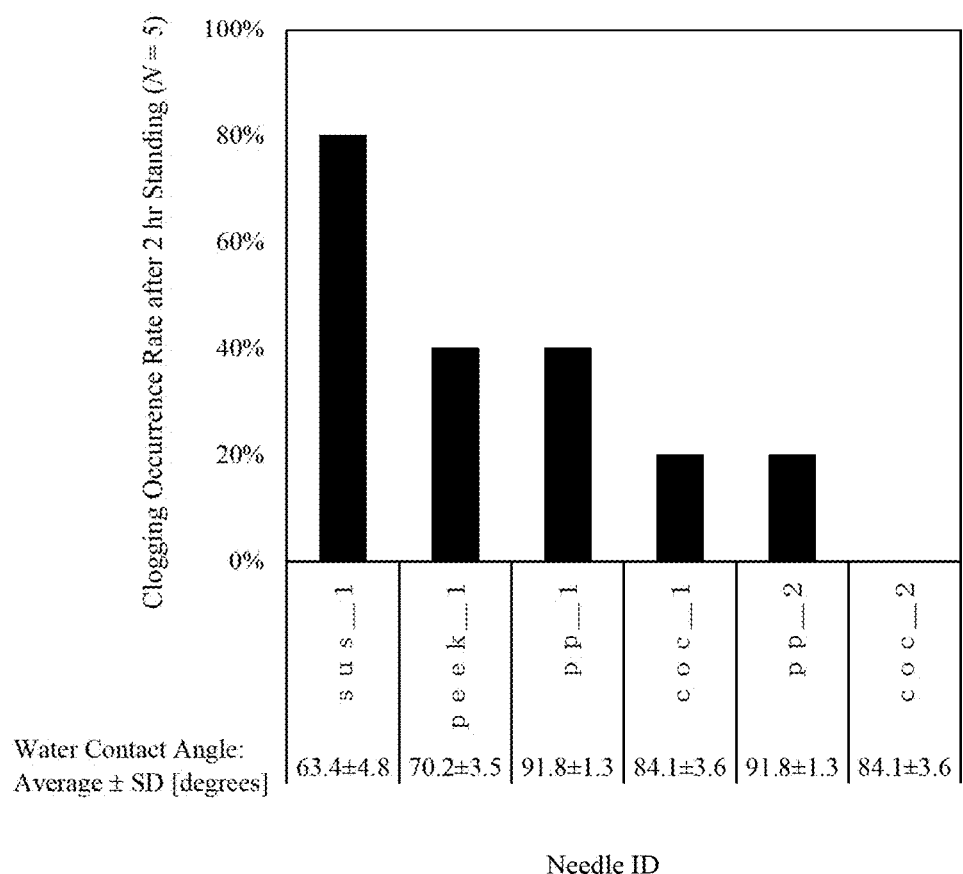
FIG. 22 is a graph illustrating occurrence of clogging of a filling nozzle (N=5) obtained after filling a pharmaceutical solution (about 1.2 mL) containing an antibody in a vessel by using a peristaltic pump and allowing the resultant to stand still for 2 hours. As the filling nozzle, a filling nozzle (sus_1) made of a stainless steel material, a filling nozzle (peek_1) made of a PEEK material, the filling nozzle (pp_1) made of the polypropylene material, the filling nozzle (coc_1) made of the cycloolefin copolymer material, the filling nozzle (pp_2) made of the polypropylene material, or the filling nozzle (coc_2) made of the cycloolefin copolymer material was used. As the pharmaceutical solution, the antibody formulation A was used.

FIG. 22 is a graph illustrating an occurrence rate (N=5) of clogging of a filling nozzle obtained, in filling about 1.2 mL of the antibody formulation A in a vessel by using the filling pump A, after allowing the resultant filling nozzle to stand still for 2 hours under ventilation condition using an HEPA filter at a wind velocity of 0.5 m/s. As the filling nozzle, filling nozzles having the following shapes were used:
Control filling nozzles:
 sus_1: a=1.8 mm, b=2.0 mm, e=163 mm, inner diameter: constant
 peek_1: a=1.6 mm, b=2.0 mm, e=120 mm, inner diameter: constant
 pp_1: a=1.6 mm, b=3.2 mm, e=65 mm, inner diameter: constant
Filling nozzles having diameter c larger than diameter a, or made of cycloolefin copolymer:
 coc_1: a=1.6 mm, b=3.2 mm, e=65 mm, inner diameter: constant
 pp_2: a=1.6 mm, b=3.2 mm, c=2.2 mm, d=3 mm, e=65 mm, f=90 degrees
 coc_2: a=1.6 mm, b=3.2 mm, c=2.5 mm, d=4 mm, e=65 mm, f=90 degrees The effect of the present invention that the occurrence rate of the clogging of a filling nozzle can be reduced by using a cycloolefin copolymer as the material of the filling nozzle was found to be exhibited. Besides, the effect of the present invention that the occurrence rate of the clogging of a filling nozzle can be reduced by expanding the inner diameter c of the tip shape of the filling nozzle made of a material having a water contact angle of specifically 58 degrees or more, and more specifically 80 to 100 degrees in using the filling nozzles of all the materials was found to be exhibited.

Text Example 12

Figure 24:
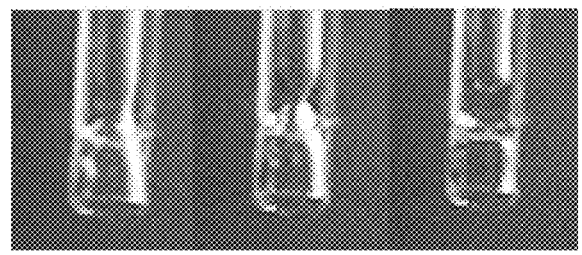
FIG. 24 is an enlarged photograph of a portion in the vicinity of a lower end of a nozzle body of a filling nozzle obtained immediately after performing the suck-back after filling a pharmaceutical solution by using the filling nozzle (cop_1: a=1.5 mm, b=3.2 mm, c=2.5 mm, d=3.5 mm, e=120 mm, f=90 degrees) made of a cycloolefin polymer, and a peristaltic filling pump at a filling rate of 200 rpm. States (from (a) to (b), and then to (c)) obtained immediately after performing the suck-back after normally performing the filling are exemplarily illustrated. Even when the suck-back is performed, the pharmaceutical solution remaining in a passage moves in the downstream direction, and adheres in the vicinity of the tip of the nozzle in the form of a droplet. In using the filling nozzle cop_1, the solution stagnates with a liquid surface height in the state (c) after completing the suck-back disposed at a position higher than the filling port lower end.

FIG. 24 illustrates a lower end liquid surface of a pharmaceutical solution stagnating in a filling nozzle and a nozzle lower end obtained by using the filling nozzle cop_1 for filling the antibody formulation A (about 1.2 mL) in a vessel by using the filling pump B. A pumping rate in the filling was set to 200 rpm, and the suck-back was performed in the filling. It was confirmed that the liquid surface height of the solution (droplet) stagnating in the filling nozzle measured when the lower end liquid surface (gas-liquid interface) of the stagnating solution was settled after the filling was in a higher position than the lower end of the filling port (FIG. 24(c)).

Test Example 13

Each of the filling nozzles pp_1, coc_2, and cop_1 was used to fill each of the antibody formulation A, the antibody formulation B, the antibody formulation C, and the antibody formulation D (about 1.2 mL (1.160 to 1.223 mL) each) in a vessel by using the filling pump B to measure a distance (mm) between the lower end liquid surface of the pharmaceutical solution stagnating in the filling nozzle and the nozzle lower end. A pumping rate in the filling was set to 200 rpm, and the suck-back was performed in the filling.

Figure 25:
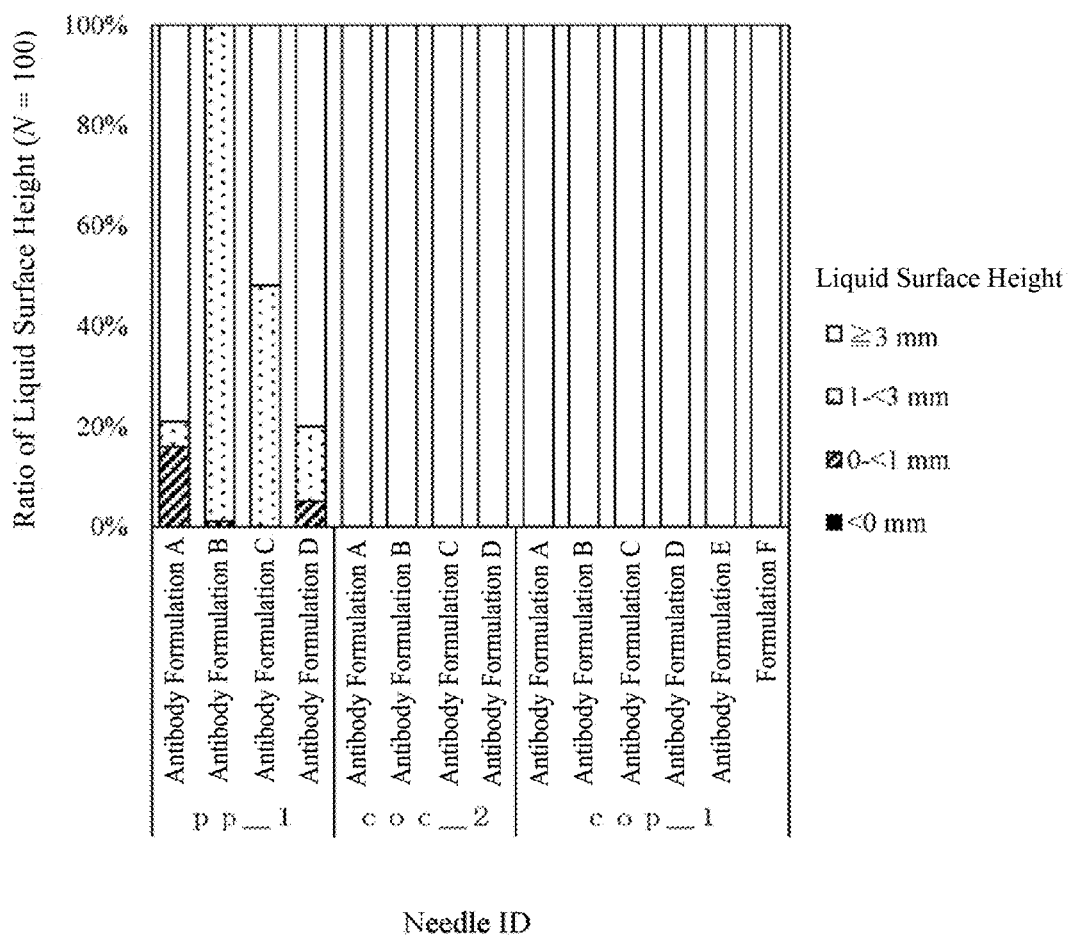
FIG. 25 is a graph illustrating ratio of liquid surface height (N=100) having, between a lower end liquid surface of a pharmaceutical solution stagnating in the filling nozzle and a nozzle lower end, distances of 3 mm or more, 1 mm or more and less than 3 mm, 0 mm or more and less than 1 mm, and less than 0 mm obtained after filling the pharmaceutical solution (about 1.2 mL) containing an antibody in a vessel by using a peristaltic pump. As the filling nozzle, the filling nozzle (pp_1) made of the polypropylene material, the filling nozzle (coc_2) made of the cycloolefin copolymer, or the filling nozzle (cop_1) made of the cycloolefin polymer material was used. As the pharmaceutical solution, the antibody formulation A, the antibody formulation B, the antibody formulation C, the antibody formulation D, an antibody formulation E, or a formulation F was used.

Results are illustrated in FIG. 25. Ratio of liquid surface height (N=100) having distances between the lower end liquid surface of the pharmaceutical solution stagnating in the filling nozzle and the nozzle lower end of 3 mm or more, 1 mm or more and less than 3 mm, 0 mm or more and less than 1 mm, and less than 0 mm were respectively checked. It was confirmed that a ratio of nozzles in which the liquid surface height of the pharmaceutical solution stagnating in the filling nozzle can be 3 mm or more can be increased by expanding the inner diameter c of the passage of the filling port of the filling nozzle in using all the antibody formulations. Besides, when the filling nozzle cop_1 was used to fill each of the antibody formulation E and the formulation F (about 1.2 mL (1.167 to 1.258 mL) each) in a vessel by using the filling pump B, it was confirmed that a ratio of nozzles in which the liquid surface height of the pharmaceutical solution stagnating in the filling nozzle can be 3 mm or more can be increased by expanding the inner diameter c of the tip shape of the filling nozzle in using all the formulations in the same manner as in using the antibody formulation A, the antibody formulation B, the antibody formulation C, and the antibody formulation D.

Test Example 14

Regarding the relationship between a filling nozzle and clogging of the filling nozzle caused by drying of a pharmaceutical solution, the following test was performed.

Figure 26:
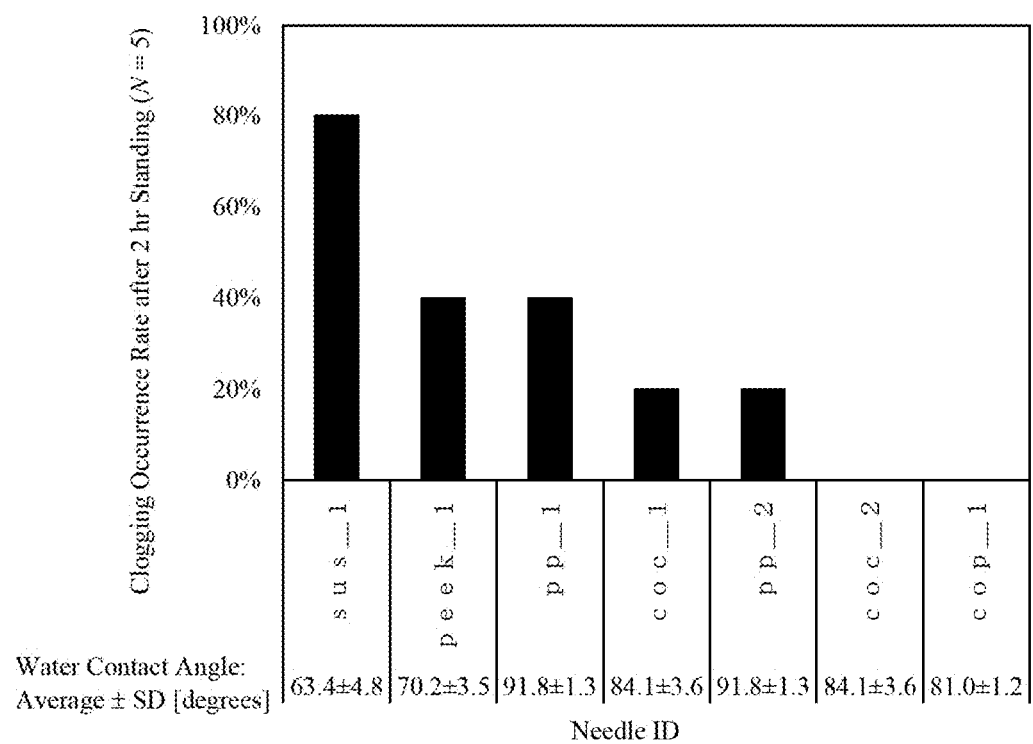
FIG. 26 is a graph illustrating occurrence of clogging of a filling nozzle (N=5) obtained after filling a pharmaceutical solution (about 1.2 mL) containing an antibody in a vessel by using a peristaltic pump and allowing the resultant to stand still for 2 hours. As the filling nozzle, the filling nozzle (sus_1) made of the stainless steel material, the filling nozzle (peek_1) made of the PEEK material, the filling nozzle (pp_1) made of the polypropylene material, the filling nozzle (coc_1) made of the cycloolefin copolymer material, the filling nozzle (pp_2) made of the polypropylene material, the filling nozzle (coc_2) made of the cycloolefin copolymer material, or the filling nozzle (cop_1) made of the cycloolefin polymer material was used. As the pharmaceutical solution, the antibody formulation A was used.

FIG. 26 is a graph illustrating an occurrence rate (N=5) of clogging of a filling nozzle obtained, in filling about 1.2 mL of the antibody formulation A in a vessel by using the filling pump A, after allowing the resultant filling nozzle to stand still for 2 hours under ventilation condition using an HEPA filter at a wind velocity of about 0.5 m/s. As the filling nozzle, filling nozzles having the following shapes were used: Control filling nozzles:
  sus_1: a=1.8 mm, b=2.0 mm, e=163 mm, inner diameter: constant
  peek_1: a=1.6 mm, b=2.0 mm, e=120 mm, inner diameter: constant
  pp_1: a=1.6 mm, b=3.2 mm, e=65 mm, inner diameter: constant
Filling nozzles having diameter c larger than diameter a, or made of cycloolefin copolymer:
  coc_1: a=1.6 mm, b=3.2 mm, e=65 mm, inner diameter: constant
  pp_2: a=1.6 mm, b=3.2 mm, c=2.2 mm, d=3 mm, e=65 mm, f=90 degrees
  coc_2: a=1.6 mm, b=3.2 mm, c=2.5 mm, d=4 mm, e=65 mm, f=90 degrees
  cop_1: a=1.5 mm, b=3.2 mm, c=2.5 mm, d=3.5 mm, e=120 mm, f=90 degrees The effect of the present invention that the occurrence rate of the clogging of a filling nozzle can be reduced by using a cycloolefin copolymer or a cycloolefin polymer as the material of the filling nozzle was found to be exhibited. Besides, the effect of the present invention that the occurrence rate of the clogging of a filling nozzle can be reduced by expanding the inner diameter c of the tip shape of the filling nozzle made of a material having a water contact angle of specifically 58 degrees or more, and more specifically 80 to 100 degrees in using the filling nozzles of all the materials was found to be exhibited.

REFERENCE SIGNS LIST 1, 11, 21, 31 . . . filling nozzle
2, 12, 22, 32 . . . nozzle body
3, 13, 23, 33 . . . tubular passage
14, 24, 34 . . . lower end of nozzle body
15, 25, 35 . . . filling port
4, 16, 26, 36 . . . lower end of filling port
27, 37 . . . inclined portion
28, 38 . . . upper end of filling port
19, 29, 39 . . . passage of filling port
4, 40 . . . lower end surface of filling port

The invention claimed is:

1. A filling nozzle, comprising a nozzle body having a tubular passage for supplying a pharmaceutical solution, and a filling port having a passage formed continuously to a lower end of the tubular passage, for discharging the pharmaceutical solution from a tip of the filling port, wherein the tubular passage of the nozzle body and the passage of the filling port have a circular peripheral cross-section, an inner diameter of the passage of the filling port is larger than an inner diameter of the tubular passage disposed on an upstream side, the tubular passage is connected to the passage of the filling port via an inclined portion having an inner diameter increasing in a downstream direction, the inner diameter of the tubular passage of the nozzle body is 1 to 5 mm, a length of the passage of the filling port is 1 to 10 mm, and a ratio of a length of the filling port in the length direction of the filling nozzle to an inner diameter at the end of the filling port is 0.7 to 1.8, and the filling nozzle is formed by using a material having a water contact angle of 50 to 120 degrees.

2. The filling nozzle of claim 1, wherein the inner diameter of the passage of the filling port in a connecting portion to the tubular passage or an inclined portion is larger than an inner diameter of the connecting portion to the tubular passage or the inclined portion.

3. The filling nozzle a of claim 1, wherein the material is a resin having a water contact angle of 80 to 94 degrees.

4. The filling nozzle of claim 1, wherein the material is a resin selected from a cycloolefin polymer and a cycloolefin copolymer.

5. The filling nozzle of claim 1, wherein the material is selected from a cycloolefin copolymer that is a copolymer of a cyclic olefin and an olefin, a cycloolefin ring-opening polymer, and a hydrogenated product of the cycloolefin ring-opening polymer.

6. The filling nozzle of claim 1, wherein the material is an ethylene-norbornene copolymer.

7. The filling nozzle of claim 6, wherein the ethylene-norbornene copolymer contains a repeating structure derived from addition polymerization of norbornene.

8. The filling nozzle of claim 1, wherein the material is selected from a norbornene ring-opening polymer that may be substituted with $C_{1-6}$ alkyl, and a hydrogenated product of the ring-opening polymer.

9. A production method for a liquid pharmaceutical formulation, comprising a step of filling a pharmaceutical solution in a vessel by using the filling nozzle of claim 1.

10. The production method of claim 9, wherein an active ingredient contained in the pharmaceutical solution is an antibody.

* * * * *